US010391574B2

(12) United States Patent
Scotchmer et al.

(10) Patent No.: US 10,391,574 B2
(45) Date of Patent: Aug. 27, 2019

(54) WELDING METHOD AND APPARATUS THEREFOR

(71) Applicant: HUYS INDUSTRIES LIMITED, Weston (CA)

(72) Inventors: Nigel Scotchmer, Willowdale (CA); Dominic Cheuk Hung Leung, Thornhill (CA); Dong Shijie, Wuhan (CN); Luo Ping, Wuhan (CN); Chang Ying, Wuhan (CN); Wang Huihu, Wuhan (CN); Xie Zhixiong, Wuhan (CN); Zheng Zhong, Wuhan (CN); Yang Wei, Wuhan (CN); Yang Lianzhuo, Wuhan (CN); Liu Qi, Wuhan (CN); Wang Yanqing, Wuhan (CN)

(73) Assignee: Huys Industries Limited, Weston (CA)

( * ) Notice: Subject to any disclaimer, the term of this patent is extended or adjusted under 35 U.S.C. 154(b) by 725 days.

(21) Appl. No.: 14/569,307

(22) Filed: Dec. 12, 2014

(65) Prior Publication Data

US 2015/0183042 A1 Jul. 2, 2015
US 2016/0297023 A9 Oct. 13, 2016

Related U.S. Application Data

(60) Provisional application No. 62/010,334, filed on Jun. 10, 2014.

(30) Foreign Application Priority Data

Dec. 16, 2013 (CN) .......................... 2013 1 0681469
Dec. 16, 2013 (CN) .......................... 2013 1 0681859

(51) Int. Cl.
*B23K 9/04* (2006.01)
*C23C 4/10* (2016.01)
(Continued)

(52) U.S. Cl.
CPC .................. *B23K 9/04* (2013.01); *B23K 9/30* (2013.01); *B23K 37/00* (2013.01); *C23C 4/10* (2013.01); *C23C 4/131* (2016.01); *C23C 4/18* (2013.01)

(58) Field of Classification Search
CPC .. B23K 9/04; B23K 9/30; B23K 37/00; C23C 4/18; C23C 4/131; C23C 4/10
(Continued)

(56) References Cited

U.S. PATENT DOCUMENTS 4,029,931 A 6/1977 Simmons
4,861,961 A 8/1989 Huys
(Continued)

FOREIGN PATENT DOCUMENTS

CA 0902189 6/1972
CA 1177545 11/1984
(Continued)

OTHER PUBLICATIONS

Park et al., "Numerical Simulation of Plunge Force during the Plunge Phase of Friction Stir Welding and Ultrasonic Assisted FSW", IMECE2008-67002, 2008 ASME International Mechanical Engineering Congress and Exposition, Oct. 31, 2008-Nov. 6, 2008, Boston, Massachusetts, U.S.A. pp. 1-6.
(Continued)

*Primary Examiner* — Chee-Chong Lee
(74) *Attorney, Agent, or Firm* — Ridout & Maybee LLP

(57) ABSTRACT

A welding process involves a fixture for holding a workpiece and a welder, or welding electrode. The fixture imposes ultrasonic vibration on the workpiece. The welder vibrates during vibration, and is operable at a first voltage for welding and a second voltage for peening. The peening may occur while the weld metal is crystallizing. The welding process may be a process of welding two parts together, or
(Continued)

of filling a groove or other feature, or of applying or restoring a surface, or of applying a hard facing or ceramic to a parent metal or object. The weld metal may be the same, or substantially the same, as the parent metal, or it may be different. The different material may be a ceramic material.

19 Claims, 29 Drawing Sheets

(51) Int. Cl.
　　*C23C 4/18*　　(2006.01)
　　*B23K 37/00*　　(2006.01)
　　*C23C 4/131*　　(2016.01)
　　*B23K 9/30*　　(2006.01)

(58) Field of Classification Search
　　USPC .................................................... 219/76.13
　　See application file for complete search history.

(56) References Cited

U.S. PATENT DOCUMENTS

| | | | | |
|---|---|---|---|---|
| 4,866,237 | A * | 9/1989 | Inoue ................ | B23K 11/0013 219/76.13 |
| 5,281,789 | A * | 1/1994 | Merz .................... | B22F 3/115 219/76.15 |
| 5,448,035 | A * | 9/1995 | Thutt .................... | B26B 9/00 219/76.13 |
| 5,688,364 | A * | 11/1997 | Sato ..................... | B24B 1/04 156/345.12 |
| 5,914,057 | A | 6/1999 | Nippert | |
| 6,020,568 | A * | 2/2000 | Joseph ................. | B23K 9/044 219/76.13 |
| 6,452,130 | B1 | 9/2002 | Qian et al. | |
| 7,538,294 | B2 | 5/2009 | Scotchmer | |
| 8,101,040 | B2 * | 1/2012 | Shibata ............... | B29C 65/3436 156/273.9 |
| 2005/0092728 | A1 | 5/2005 | Barbeau et al. | |
| 2006/0029512 | A1 | 2/2006 | Dong et al. | |
| 2011/0042356 | A1 | 2/2011 | Leung et al. | |
| 2013/0260648 | A1 | 10/2013 | Rementer | |

FOREIGN PATENT DOCUMENTS

| | | |
|---|---|---|
| CA | 2712119 | 2/2011 |
| CN | 102019531 | 4/2011 |
| CN | 103993312 B | 9/2016 |
| EP | 0192880 | 9/1986 |
| WO | 95/11107 | 4/1995 |
| WO | 2006/122410 | 11/2006 |

OTHER PUBLICATIONS

Chen et al., Surface modification of resistance welding electrodes by electro-spark deposited composite coatings Part II, Metallurgical behavior during welding, www.elsevier.com, Science Direct, Surface & Coatings Technology 201 (2006), pp. 2419-2430.

Chen et al., Surface modification of resistance welding electrode by electro-spark deposited composite coatings: Part I, Coating characterization, www.elsevier.com, ScienceDirect, Surface & Coatings Technology 201 (2006), pp. 1503-1510.

Zou et al., "Surface modified long-life electrode for resistance spot welding of Zn-coated steel", www.elsevier.com, ScienceDirect, Journal of Materials Processing Technology 209 (2009), pp. 4141-4146.

Kumar, "Ultrasonic assisted friction stir processing of 6063 aluminum alloy", www.elsevier.com, ScienceDirect, Archives of Civil and Mechanical Engineering 16 (2016), pp. 473-484.

Avettand-Fenoel et al., "A review about Friction Stir Welding of metal matrix composites", www.elsevier.com, ScienceDirect, Materials Characterization 120 (2016), pp. 1-17.

Lu, "Improvement of copper plating adhesion on silane modified PET film by ultrasonic-assisted electroless deposition", www.elsevier.com, ScienceDirect, Applied Surface Science 256 (2010), pp. 3554-3558.

Liu, "Elimination of tunnel defect in ultrasonic vibration enhanced friction stir welding", www.elsevier.com, ScienceDirect, Materials and Design 90 (2016), pp. 350-358.

Wang et al., "Si particulate-reinforced Zn-Al based composites joints of hypereutectic Al-50Si alloys by ultrasonic-assisted soldering", www.elsevier.com, ScienceDirect, Materials and Design 107 (2016), pp. 41-46.

Niksefat et al., "Mechanical and electromechanical properties of ultrasonic-assisted electrodes deposition of Ni—B—TiO2 composite coatings", www.elsevier.com, ScienceDirect, Journal of Alloys and Compounds 633 (2015), pp. 127-136.

Zhao et al., "Microstructure evolution and mechanical properties of ultrasonic-assisted soldering joints of 2024 aluminum alloys", www.elsevier.com, ScienceDirect, Trans Nonferrous Met. Soc. China 21 (2011), pp. 1937-1943.

Rostamiyan et al., "Experimental studies on ultrasonically assisted friction stir spot welding of AA6061", www.elsevier.com, ScienceDirect, Archives of Civil and Mechanical Engineering 15 (2015), pp. 335-346.

Chen et al., Surface Modification of Resistance Welding Electrodes by Electro-Spark Deposited Coatings, Department of Mechanical Engineering; University of Waterloo; Waterloo, ON, Canada; Coatings 2005; Materials Science & Technology 2005, pp. 59-62.

Total Patent, machine translation of Chinese Patent Publication No. CN102019531.

Total Patent, machine translation of Chinese Patent Publication No. CN103993312.

* cited by examiner

In-Process ESD Coating/Peening Actions

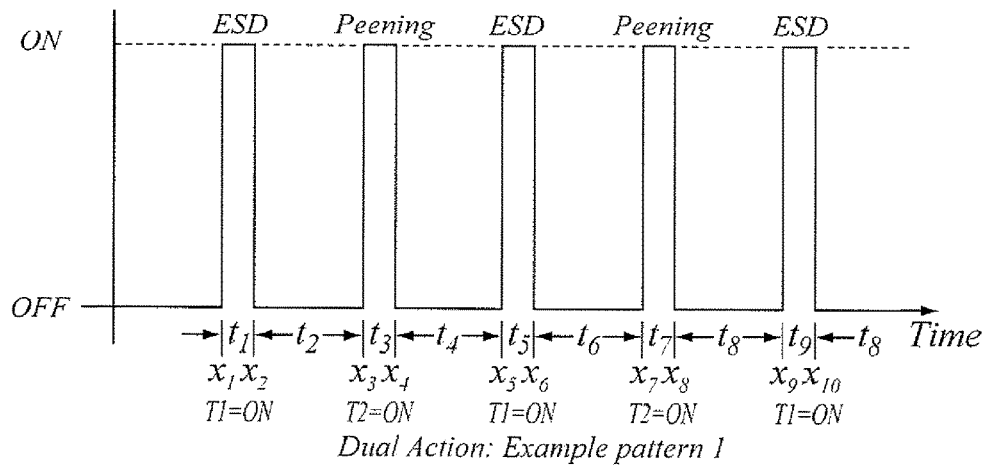
FIG. 17b — Dual Action: Example pattern 1
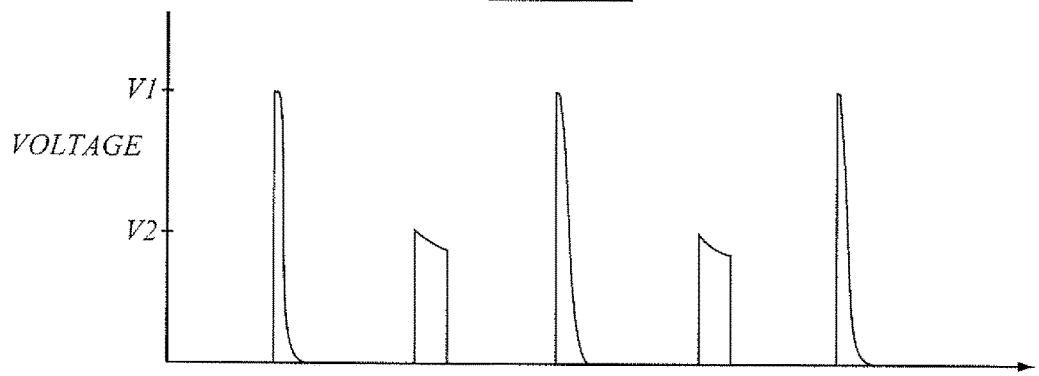
FIG. 17c
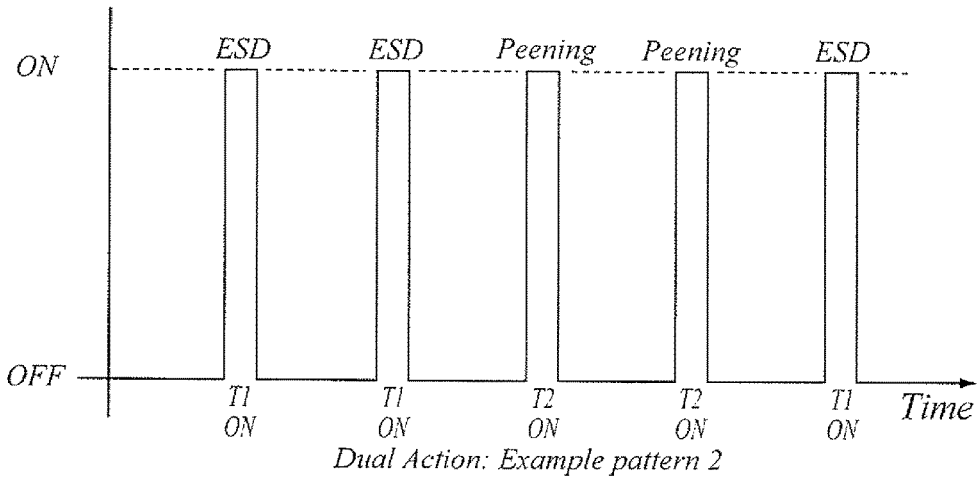
FIG. 17d — Dual Action: Example pattern 2

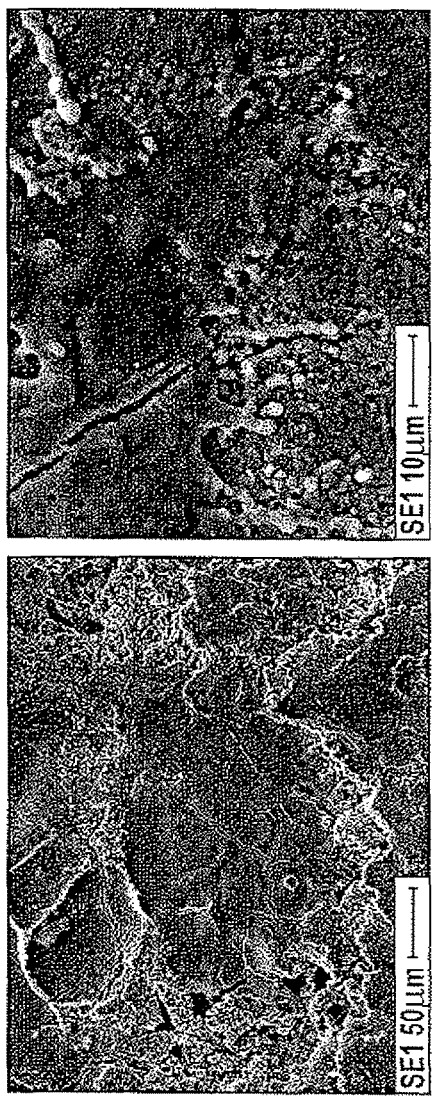
FIG. 18e
FIG. 18d
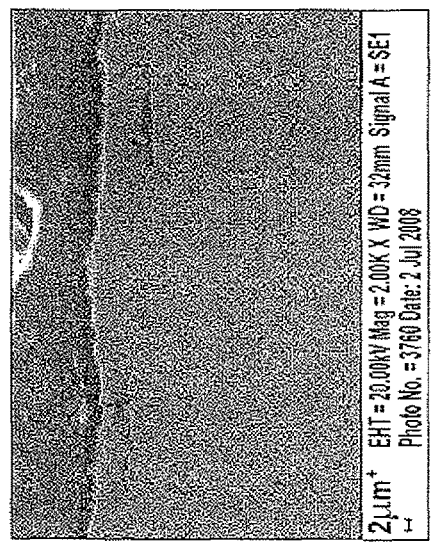
FIG. 18f
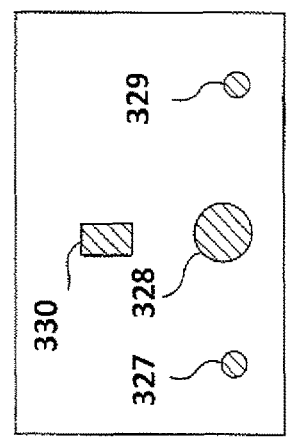
FIG. 24

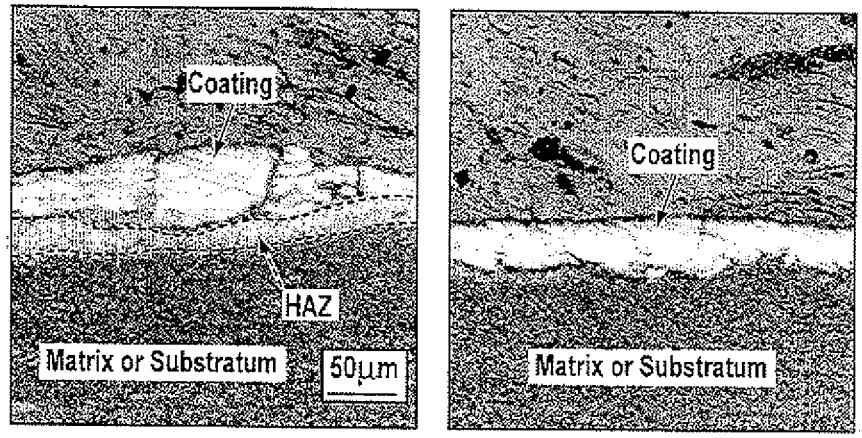
FIG. 27a   FIG. 27b
FIG. 27
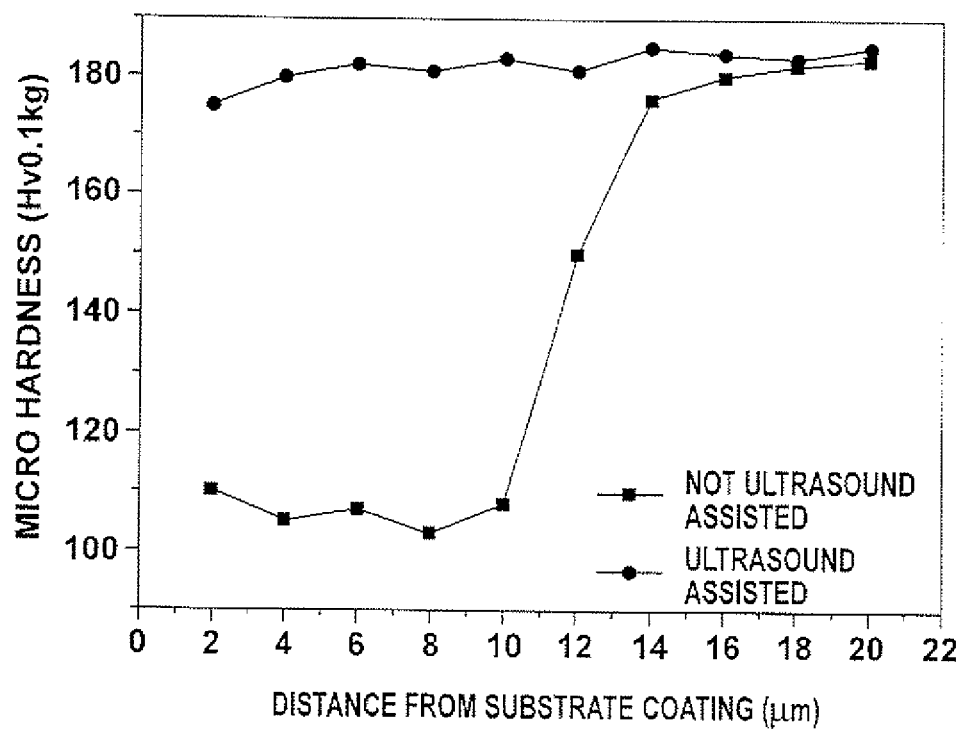
FIG. 28

WELDING METHOD AND APPARATUS THEREFOR

This application claims the benefit of the priority of U.S. Provisional Patent Application Ser. No. 62/010,334, filed Jun. 10, 2014, the specification and drawings thereof being incorporated by reference in their entirety herein.

This application claims the benefit under the Paris Convention of the priority of Chinese Patent Application 2013 1068 1469.1 filed Dec. 13, 2013, the specification and drawings thereof being incorporated herein by reference.

This application claims the benefit under the Paris Convention of the priority of Chinese Patent Application 2013 1068 1599.1 filed Dec. 17, 2013, the specification and drawings thereof being incorporated herein by reference.

FIELD OF THE INVENTION

This application relates to methods and associated tools for welding.

BACKGROUND OF THE INVENTION

In a number of industries it may be helpful to be able to coat a metal substrate, or to join together by welding, or to make repairs by welding processes of existing objects. The weld metal deposit may have certain desired qualities with a coating of a similar or dissimilar material. In some cases it may be desirable to coat a metal substrate with a ceramic surface coating. Sometimes the coating is added for wear resistance, or to replace or re-surface a worn member.

In the electro-spark deposition (ESD) process, a consumable electrode material is brought into contact with a metallic base surface to be treated to deposit a coating, which may be a ceramic coating, on the metallic substrate. Electro-Spark Deposition (ESD). One such application may pertain to welding electrodes for use in a production line. Welding electrodes are generally made of copper. The electrode may have a surface coating, such as a ceramic coating, that may be intended to increase electrode life. However, the substrate material need not be limited to welding electrodes or to copper.

ESD is a low-stress surfacing-hardening process that causes little distortion to the workpiece. ESD involves atomic-level metallurgical bonding of a discharge electrode coating material to the base metal by electro-spark discharge. ESD is a surface treatment process that improves the physical and mechanic properties of the surface of the base metal. As a form of micro-arc welding technology, ESD introduces a large current pulse during a capacitance discharge. A high temperature (5000~25000 K) plasma arcing column melts or vaporizes a small part of the electrode rod coating material. The molten or vaporized electrode material is transferred to the surface of the base metal by this pulsed arcing micro welding. These traits permit ESD to be used in many surface treatment applications, including the surface coating of resistance spot welding electrodes. Successful ESD examples of resistance spot welding electrode coatings includes the surface in-situ deposition of TiC, TiB2, and TiB2-TiC. Welding electrodes with TiC, TiB2 or TiC—TiB2 coatings have been used in the spot welding of automobiles. ESD treated welding electrodes have made significant advances in industrial applications. coatings of vanadium-carbide, tungsten-carbide, titanium-diboride, zirconium-diboride, Titanium-carbide, $Cr_3C_2$, and so on, might be applied to various tool steels or aluminum, or other metals. However, there are some defects found in ESD coatings. For example, the grain in the heat affected zone (HAZ) near the coating layer may become coarse due to high thermal stresses arising during the ESD process (as shown in the Figures). Consequently, welding electrodes may not achieve the full potential life extension because of the flaws in the heat affect zone of the substrate matrix.

In the coating of welding caps using ESD technology, a TiC rod is connected to the positive terminal of a capacitor, and then brought toward the surface of a copper cap. The copper cap is connected to the negative terminal of the capacitor. Arcing occurs when they are brought close together. This raises the temperature in the arcing column and a molten droplet is produced at the tip of the TiC rod. The molten droplet will then be accelerated by the plasma jet and will strike the surface of the substrate forming a splash of TiC spot on the surface electrode material workpiece, and, if successful, the coating material will weld to the underlying substrate material. After many discharges, the surface will be covered in a layer of TiC coating. During the coating process, the molten droplets strike the substrate at a high velocity in the arcing column. As seen in FIGS. 18*a*, 18*b* and 18*c* herein, splashing may occur, resulting in cracks or delamination as observed in the coating layer. These defects may tend to reduce the product life of the caps to a great extent. Some researchers in university or industry have been trying to understand the cause of the coating defects and find ways to reduce them.

The surface area will be coated with a layer of the electrode material when swept by the electrode. The electrode cap may be mounted to a moving device. The condition of the contact may be dependent on the relative motion of the rod of depositing electrode coating material and the electrode cap to be coated.

Resistance spot welding is still the main technology used in the automotive assembly, especially in body frame construction. The life of welding electrodes has become an important issue in the resistance welding of galvanized steel and aluminum sheets. This in turn increases the consumption in automotive production and thus raises the production cost. To solve this problem, researchers conducted many studies. The most representative research result is the application of a protective coating layer (metallic or cermet) to the surface of welding electrodes through the electro-spark deposition process. This helps the welding electrodes to resist or delay alloy migration and plastic deformation during welding, thus improving the usage life of resistance welding electrodes.

Electro-spark deposition (ESD) is a micro-arc pulse welding technology which transfers electrode material to a metallic substrate with the use of high frequency and short duration current pulses. The main advantage of electro-spark deposition is the ability to produce metallurgical bonding between the coating material and the substrate base metal with low heat transfer. Due to thermal shock when the spark discharges, ESD coatings may tend to have flaws. FIG. 5 herein shows typical coating defeats (delaminations, porosity, cracks and uneven coating) of a welding electrode after the application of TiC coating using the ESD process.

Different types of processing technology have been tried by various domestic and foreign researchers to achieve grain refinement using the friction stir welding processing. Ultrasonic grain refinement processing, as a secondary process technology, has been widely studied and reported in areas such casting, welding, and surface material treatment. Kwanghyun Park was the first to study the ultrasonic assisted friction stir spot welding equipment and processes.

Ultrasonic assisted friction stir welding process can produce welded joints with better performance than friction stir welding alone.

Friction stir processing technology is newly developed based on the friction stir welding process for the surface coating modification of composite material. Due to the unique thermal or mechanical characteristics, or both, friction stir processing has been used in the preparation and modification of surface coatings. Zhou Xiaoping et al (Chinese invention patent CN201010570898.8, the preparation and modification of Al2O3+TiB2+Al composite coating on aluminum surface by friction stir welding) has demonstrated that the density and micro-hardness of Al2O3+TiB2+Al composite coating produced by thermal spraying process can be improved by friction stir processing.

Similarly, Chinese invention patents (CN 201310050662.5) "A semi-solid ultra fine grain/nano-crystalline plate processing method based on ultrasound-assisted friction stir processing", (CN 201310049003.X) "An ultrasound-assisted semi-solid friction stir processing method in a controlled low temperature environment", and (CN 201310049927.X) "a realization of surface UFG/nano material based on ultrasonic assisted semi-solid friction stir processing method" have adopted ultrasound-assisted semi-solid friction stir processing technology, implemented with the use of a stirring pin for surface treatment. As a result, a friction stir process may not be suitable for the modification of surface coatings, such as those on resistance spot welding electrodes. In addition, the process is difficult, and power consumption may be high.

Resistance welding electrodes serve several purposes or functions: the conduction of welding current; application of closing pressure on the mating parts to be welded, and heat dissipation. The temperature of the welding electrode in contact with the workpiece is quite high, and the welding electrode itself generates heat when welding current flows due to its own internal resistance. The temperature on the top surface of the welding electrode may rise very quickly to a level that is only marginally lower than the weld nugget temperature.

In the view of the inventors herein, ultrasonic vibration may help to improve welding structure and performance in the welding and casting industries. Ultrasonic cavitation and acoustic streaming effects of ultrasonic vibration that may aid in refining grains in the heat affects zones of castings and weld pools. Chinese patent CN102019531A, which pertains to a portable ultrasonic assisted electro-spark deposition integrated repair and polish device and technology, suggests an ultrasonic approach. However, the ultrasonic excitation is added to modulation of the discharge electrode. This ultrasonic vibration applies only to the coating transfer of the deposition material. It appears to have little effect on the coating layer on the base metal of the workpiece.

SUMMARY OF INVENTION

The following summary is provided to introduce the reader to the more detailed discussion to follow. The summary is not intended to limit or define the claims.

According to an aspect of the invention there is a vibrating hand-held coating material electrode holder. In another aspect of the invention there is a ventilated hand-held coating material electrode holder. In a further aspect of the invention there is a vibrating hand-held coating material electrode holder that is internally ventilated.

In an aspect of the invention there is a welding apparatus. It has a fixture to which to secure at least one workpiece; and a welding head positioned to address a workpiece held in the fixture. The fixture has a vibration source by which to transmit vibration to the workpiece. The welding head is one at least of (a) operable during welding to vary voltage between a first magnitude and a second magnitude; and (b) operable during welding to vibrate independently of the fixture.

In a feature of that aspect of the invention, the apparatus includes at least one ultrasonic vibration head operable to transmit ultrasonic vibration to the workpiece during welding. In another feature, the apparatus includes a power source operable to drive the welding head in a welding mode and in a peening mode. In still another feature, at least one of the fixture and the welding head includes a motion transmitting drive apart from a vibration drive, the motion transmitting drive is operable globally to cause relative motion between the fixture and the welding head. In a further feature, at least one of the fixture and the welding head is programmable to move according to a pre-set course. In another feature, in use, the welding head is biased against the workpiece. In still another feature, the vibration source of the fixture has an engagement member for contacting the workpiece, and the engagement member is free from plastic deformation elements. In a further feature, the welding apparatus is both (a) operable during welding to vary voltage between a first magnitude and a second magnitude; and (b) operable during welding to vibrate independently of the fixture.

In another aspect of the invention there is a method of welding a workpiece. The method includes mounting a vibration source to transmit a first vibration signal to the workpiece; opposing the workpiece with a welder; and operating the welder according to at least one of: (a) operating at a first voltage magnitude for a first time period; and operating at a second voltage magnitude at a second time period; and (b) vibrating the welder according to a second vibration signal; and operating the vibration source while operating the welder.

In a feature of that aspect of the invention, the method includes vibrating the welder to peen deposited weld metal during transmission of the first vibration signal. In another feature, the second voltage magnitude is zero. In another feature, the method includes securing the workpiece in a fixture. In a further feature, the method includes moving at least one of the fixture and the welding head along a pre-programmed path while transmitting the first vibration signal to the workpiece. In another feature, the workpiece has more than one part, and the method includes welding at least two parts of the workpiece together.

In still another feature, the method includes operating the welder to deposit a material on the workpiece that is different from the parent material of the workpiece. In anther feature, the method is a method of surface coating the workpiece. In still another feature, the first vibration signal is an ultrasonic vibration signal the method includes both (a) operating at a first voltage magnitude for a first time period; and operating at a second voltage magnitude at a second time period; and (b) vibrating the welder according to a second vibration signal; and operating the vibration source while operating the welder.

In yet another feature, ultrasonic vibration is applied directly to the workpiece during at least one of: (a) application of a welding rod to the workpiece; (b) crystallization of welded material; and (c) peening of welded material. In another feature it is applied during all of (a), (b), and (c). In another feature, ultrasonic vibration is applied to the workpiece during at least two of: (a), (b), and (c). In a further feature, the welding process is an ESD process and the welder uses a welding rod having a ceramic material composition that includes at least one of (a) TiC; and (b) TiB$_2$.

In an aspect of the invention there is a coating material electrode holder It has a seat in which to mount an electrode; a mechanical drive operable to cause the electrode holder to move; and a power supply connection through which to supply electrical power to the electrode. The electrode holder has at least two modes of operation, the modes of operation including a first mode and a second mode. In the first mode the vibrator imposes mechanical motion upon the electrode seat and supplies an ESD spark initiation voltage to the electrode seat. In the second mode the mechanical drive imposes mechanical motion upon the electrode seat and supplies a voltage to the electrode seat that is of lesser magnitude than the ESD spark initiation voltage.

In a feature of that aspect of the invention the drive is a vibrator. In another feature, the holder is an hand held electrode holder. In a further feature the second mode the voltage has zero magnitude. In another feature, the second mode the voltage is less than one half of the ESD spark initiation voltage. In a further feature, the drive oscillates, and is at least one of (a) amplitude adjustable; and (b) frequency adjustable.

In another aspect, there is an electrode holder for a coating material electrode. The holder has an electrically insulated handle by which an operator may grasp the electrode holder; an electrode seat mounted to the handle, the electrode seat defining a seat for an electrode rod; a power source in electrically conductive connection with the electrode seat, whereby an electrode rod received in the electrode seat may receive electrical current from the power source; and a vibration source mounted to the handle; and a power supply controller. The power supply controller is operable to supply power to the electrode seat in at least a first mode and a second mode. In the first mode the power supply is set to supply power at a first voltage, the first voltage being an ESD initiation voltage. In the second mode the power supply is set to supply power at a second voltage, the second voltage having a magnitude less than the ESD initiation voltage.

In a feature of that aspect of the invention, the vibration source is frequency adjustable. In another feature, the vibration source has an output frequency in the range of 100 Hz to 500 Hz. In another feature, the second voltage is less than half the ESD initiation voltage. In a further feature, the vibration source includes an exciter and a resilient transmitter, the electrode seat being mounted to the resilient transmitter. In still another feature, the transmitter is adjustably tunable in vibration frequency. In yet another feature, the electrode seat has an axial direction associated with a long axis of electrode rods mounted therein, and the vibration source, in operation, oscillates the handle with a component of force in the axial direction. In still another feature, the electrode seat has an axial direction; the exciter oscillates in operation; and oscillation of the exciter includes a component of force in the axial direction. In another feature, the exciter includes a rotating eccentric. In still another feature, the resilient transmitter includes a spring mounted between the exciter and the electrode seat. In yet another feature, the electrode seat is adjustably orientable relative to the handle. In still yet another feature, the electrode holder includes at least one electrical brush mounted between the power source and the electrode seat, whereby the electrode seat remains in electrically conducting relationship to the power source notwithstanding re-orientation of the electrode seat.

In another aspect there is a method of surface coating treatment of a coated welding electrode, the coating material having a melting temperature. The method includes establishing a coating deposition portion on at least a first region of the welding electrode at an elevated temperature less than the melting temperature of the coating material; and plastically deforming that coating deposition portion at that elevated temperature.

In a feature of that aspect, the method includes beating the coating deposition portion. In another feature, the method includes melting a portion of a coating material electrode onto the welding electrode to establish the coating deposition portion; and using the coating material electrode subsequently to strike the coating deposition portion at the elevated temperature thereby plastically to deform it. In another feature, the method includes applying a first voltage to establish the coating deposition portion, the first voltage being a melting voltage; and applying a second voltage, the second voltage being a non-melting voltage when plastically deforming the coating deposition portion. In another feature, the second voltage has a magnitude that is one of: (a) less than the first voltage; and (b) substantially zero. In a still further feature, the method includes establishing vibratory relative motion between the coating material electrode and the welding electrode workpiece.

In another aspect, there is a method of depositing a coating on a welding electrode workpiece. The method includes establishing a coating material electrode in an electrode holder proximate to a workpiece; establishing a first voltage differential between the coating material electrode and the electrode workpiece, the first voltage differential being at least as great as an ESD initiation voltage; striking an arc between the coating material electrode and the welding electrode workpiece whereby to cause material of the coating material electrode to be deposited on the electrode workpiece; breaking contact between the coating material electrode and the electrode workpiece; and striking the electrode workpiece again while the coating material electrode is at a second voltage differential, the second voltage differential being of lesser magnitude than the ESD initiation voltage.

In a feature of that aspect, the welding electrode workpiece is mounted to a drive, the drive being operable to move the welding electrode workpiece in at least one degree of freedom of motion while the coating material electrode is held in the electrode holder; and while the electrode rod is biased against the workpiece, vibrating the electrode holder, whereby coating material from the coating material electrode is deposited on the workpiece. In another feature, the second voltage differential has substantially zero magnitude. In a further feature, the second voltage differential is less than one half of the ESD initiation voltage. In another feature, the method includes establishing vibratory motion between the coating material electrode and the electrode workpiece. In a still further feature, the method includes establishing the vibratory motion in a frequency range between 100 Hz and 500 Hz. In still another feature, the method includes adjusting the voltage differential between contact periods of the coating material electrode and the electrode workpiece. In yet another feature, the method includes plastically deforming deposited coating material from the coating material electrode as that deposited material cools on the electrode workpiece. In a further feature, the ESD initiation voltage is in the range of 25-50 V. In still another feature, the second voltage is in the range of 5 to 30 V.

In a further feature of any of the methods herein, the electrode rod is a ceramic composition. In a further feature that ceramic composition is titanium carbide or titanium diboride. In another feature the rod is a nickel rod.

In a further aspect of the invention there is the method of using any of the apparatus having any combination of the aspects and features described herein, that method including the steps of mounting the electrode in the holder, or causing the holder to vibrate, and of placing the electrode and the work piece in contact while charged with opposite electrical polarities.

In an aspect of the invention there is a surface modification apparatus and method for treating electro-spark deposition coating layers. It may include a processing method for a surface coating in which there is use of a flat or curved shaped head applying pressurized, or force biased rotating friction to the surface coating on a workpiece. Ultrasonic vibration is simultaneously applied to the workpiece or the rotating head. In a feature of that aspect of the invention the shape of the friction spinning head or probe is flat or curved surface, without a projection spinning pin or needle.

In this aspect, it may be that the coating material would not be removed from the base material of the workpiece. It may be that no base material of the substrate is disturbed in the process. This may help to maintain the coating material composition during the process. With the addition of ultrasonic vibration to the surface coating during the process, coating defects (delaminations, porosity, cracks and uneven coating) may be reduced or eliminated and high binding strength to the base material may be achieved. In addition, the physical and mechanical properties of the coating may also be improved.

In a feature of that aspect of the invention, the force-biased rotating friction head and the workpiece spin in opposite directions. The surface coating may undergo a continuous treatment process. The composition of the surface coating may remain unchanged while coating defects are eliminated giving better coating performance as a result.

In another aspect of the invention there is an apparatus for the surface modification of surface coating on workpieces. It includes a work table for the clamping of the workpieces. It has an ultrasonic, force-biased rotating friction device and an ultrasonic power source. The ultrasonic rotating friction device has a force-biased rotating friction module and an ultrasonic transducer. The ultrasonic transducer is electrically connected to the ultrasonic power source. The shape of the rotating friction probe may be either flat or curved. The friction probe may be free of any projection pin on the flat or curved surface thereof. The surface may be planar.

In various features of that aspect of the invention, the apparatus may include one or more of the following: a rotating electrode holder workstation having an equipment frame, an electric motor, a transmission belt, pulley, supporting bearings, a transmission shaft, a clamping chuck and a dual guiding rails; an integrated ultrasonic transducer with rotating friction head apparatus comprising: a pair of sliders, upper and lower panels, screw shaft, positive and negative inputs of the ultrasonic power, a sliding conductor, bearings, a belt pulley, a driving belt, an electric motor, an ultrasonic transducer, a transducer horn, a rotating friction head and the housing; an ultrasonic power source having ultrasonic positive output terminal, an ultrasonic power control knob, the ultrasonic negative output terminal, and a power switch.

Integration of the workstation, pressurized rotating friction module and the ultrasonic power source: The equipment frame is fixed to the workstation, the electric motor drives the transmission shaft through the coupling of the driving belt and pulley; the clamping chuck for work pieces is mounted to the transmission shaft; The integrated rotating friction assembly is fitted to the workstation through the fitting of the sliders to achieve free repeating movements, this allows rotating friction application to the surface coating of workpiece on the workstation assembly; the lower panel of the rotating friction assembly is attached to the upper panel through the coupling of the screw shaft, this allows the rotating friction assembly to move in a vertical direction and thus to achieve the application of pressure during the process by adjusting the screw shaft; the ultrasonic input +ve and −ve terminals are connected to the corresponding terminals of the ultrasonic power source; the sliding conductor is connected to the ultrasonic transducer with the use of electrical wires; the transducer horn is mounted to the ultrasonic transducer; the rotating friction head is driven to rotate through the driving of the electric motor, driving belt, belt pulley and the support bearing; this setup achieves the application of the pressurized rotating friction to workpiece on the workstation; the rotating friction assembly is then enclosed in the housing.

On the workstation, the clamping chuck for mounting the workpiece is driven to rotate by the electric motor through the transmission of the driving belt and pulley. With the fitting of the 2 sliders on the lower panel and the 2 guiding rails on the workstation, the integrated ultrasonic rotating friction assembly can be used to process the workpiece repeatedly.

With the integrated ultrasonic rotating friction assembly attached to the upper panel, the upper panel is attached to the lower panel through the screw shaft. Not only does the screw shaft move the upper panel in a vertical direction, it also allows certain pressure to be applied to the workpiece. The ultrasonic rotating friction assembly is driven by the motor through the transmission of the pulley, belt and bearings. Through the adjustment to the screw shaft, the pin-less friction head can be moved to make friction contract with the workpiece. Furthermore, with the application of pressure and the ultrasonic vibration simultaneously, it is made possible to modify surface coatings on workpiece using ultrasonic pressurized rotating friction processing.

In an aspect of the invention there is a process of surface treatment of an ESD coating. The process includes biasing a friction head assembly against a workpiece to which an ESD coating is applied; moving the workpiece relative to the friction head while in contact therewith; and subjecting the coating to ultrasonic vibration while the friction head is in contact therewith.

In a feature of that aspect of the invention, the process includes rotating the workpiece while the friction head is in contact therewith. In another feature, the process includes rotating said friction head assembly while it is in contact with the workpiece. In a further, additional feature, the process includes rotating the workpiece while the friction head is in contact therewith. In another feature, the coating is a TiC coating. In another feature, the process includes depositing the ESD coating. In still other features, the process may include at least one of: (a) an ultrasonic frequency of about 50 kHz; (b) a biasing force of about 200 N; and (c) a rotational speed of the rotating friction head of about 1400 rpm.

In another aspect of the invention, there is an apparatus for the processing of surface coating modifications of an ESD coating on a workpiece surface. The apparatus has a work station for the mounting and rotation of the workpiece; a friction assembly, operable, in use, to be biased against the workpiece; and an ultrasonic transducer mounted to transmit ultrasonic vibration to the workpiece while the workpiece is in contact with the rotating friction assembly.

In a feature of that aspect of the invention, the apparatus has an ultrasonic power source; and the ultrasonic transducer is connected to the ultrasonic power source. In another feature, the friction head has a shape that is one of (a) flat; and (b) curved. In still another feature, the friction assembly is also mounted for rotation. In still yet another additional feature, the apparatus is such that at least one of (a) the ultrasonic transducer operates at about 50 kHz; (b) in use, the biasing force is about 200 N; and (c) the friction head is mounted for rotation at about 1400 rpm.

In another aspect of the invention there is a surface coating process for use in applying an ESD coating to a workpiece. The process includes applying a surface coating to a workpiece using electro-spark deposition; and applying ultrasonic vibration to the workpiece.

In a feature of that aspect of the invention, the ultrasonic vibration is applied to the workpiece during the electro-spark deposition of the coating. In another feature, the ultrasonic vibration is applied to the workpiece during crystallization of the coating. In still another feature, the ultrasonic vibration is applied to the workpiece during the electro-spark deposition of the coating and during crystallization of the coating. In a further feature, the ESD coating is deposited on the workpiece by an applicator. The applicator is a vibrating applicator. The applicator vibrates during deposition of the coating independently of the ultrasonic vibration. In still another feature, the workpiece is held in a rotating tool holder, and the workpiece is driven to rotate during the process. In a further additional feature, at least one of (a) the ultrasonic vibration is applied to the workpiece during the electro-spark deposition of the coating; and (b) the ultrasonic vibration is applied to the workpiece during crystallization of the coating. In a still further feature, the ESD coating is deposited on the workpiece by an applicator. The applicator is a vibrating applicator, and the applicator vibrates during deposition of the coating in addition to the ultrasonic vibration.

In another feature, the ESD coating is deposited on the workpiece by an applicator. The applicator is a vibrating applicator, and the applicator vibrates during deposition of the coating in addition to the ultrasonic vibration. In an additional feature, the process includes applying the ESD coating to a resistance spot welding electrode as the workpiece. In still another feature, the process includes depositing a coating that includes at least one of (a) TiC and (b) $TiB_2$, on the workpiece. In yet another feature, the process includes applying the coating to a metal matrix that includes copper. In a still further feature, the process includes applying the ESD coating to a resistance spot welding electrode as the workpiece, that spot welding electrode having a metal matrix that includes copper; and depositing a coating that includes at least one of (a) TiC and (b) on the workpiece.

In another aspect of the invention there is an apparatus for electro-spark deposition of a surface coating on a workpiece. The apparatus has a tool holder to which the workpiece is mounted; a coating applicator; and an ultrasonic vibration source mounted to act on the tool holder, and thereby directly to apply ultrasonic vibration to the workpiece.

In a feature of that aspect of the invention, the ultrasonic vibration source is operably connected to apply ultrasonic vibration to the tool holder at least one of (a) during the electro-spark deposition of the coating; and (b) during crystallization of the coating. In another feature, the coating applicator is a vibrating coating applicator. In a further feature, the tool holder is a rotating tool holder. In still another feature, the tool holder is a rotating tool holder; and the ultrasonic vibration source is operably connected to apply ultrasonic vibration to the tool holder at least one of: (a) during the electro-spark deposition of the coating; and (b) during crystallization of the coating. In a further additional feature, the coating applicator is a vibrating coating applicator. In a still further feature, the workpiece is a resistance spot welding electrode. In another feature, the apparatus has a vibrating applicator, an ESD power supply, an ultrasonic transducer assembly, a work station having a rotating drive and an ultrasonic generator; the ultrasonic generator being connected to drive the ultrasonic transducer; the ultrasonic transducer assembly and the rotating drive work station being assembled as a single integrated unit; and the workpiece being mountable in a tool holder seat vibrated by the ultrasonic transducer.

In still another feature, the apparatus includes: an ESD power supply having a positive power terminal and a negative power terminal; a vibrating applicator having a resilient conductor spring, a discharge electrode mounting, a discharge electrode, a driven eccentric, a handle, an insulated support, a flexible drive shaft, and a low-power applicator motor; an integrated transducer assembly on which to mount a workpiece to be coated; a work-station negative terminal, an integrated transducer negative terminal, an integrated transducer positive terminal, an integrated transducer body, a transducer horn, an ultrasonic transducer, a flat pulley, bearing, and tool holder; a work-station drive assembly having a work bench drive motor, a drive belt; an ultrasonic generator having an ultrasonic power output negative terminal, and an ultrasonic power output positive terminal. The ESD power positive terminal is connected to the conductor spring. The ESD power negative terminal is connected to the work-station negative terminal. The discharge electrode is mounted to the conductor spring. The applicator is connected to the low-power motor through the flexible shaft. The eccentric wheel is driven in rotation by the driving of the low-power motor through the flexible shaft to drive vibrating deposition. The ultrasonic power output negative terminal is connected to the integrated transducer negative terminal. The ultrasonic power output positive terminal is connected to the integrated transducer negative terminal. The integrated ultrasonic transducer assembly is driven in rotation by the drive motor through the flat pulley and drive belt. The ultrasonic transducer is connected to the integrated transducer negative terminal and the integrated transducer positive terminal, respectively. The transducer horn and ultrasonic transducer are combined to form a shaft of the rotary work station; the tool holder being mounted to the rotary work station; whereby the workpiece is mounted to the work-station for rotating ultrasonic-assisted electro-spark deposition.

There are many combinations and permutations of aspects and features. It will be understood that any of the features may be combined, as appropriate, with any of the aspects enumerated herein.

BRIEF DESCRIPTION OF THE ILLUSTRATIONS

The foregoing aspects and features of the invention may be explained and understood with the aid of the accompanying illustrations, in which:

FIG. 16 is a schematic of a power source for the handle of FIG. 1, 10; or 15a;

FIG. 17b is a time schedule for deposition and peening switch-"On" and "Off" conditions for of the power source of FIG. 16;

FIG. 17c is a Time v. Voltage representation applied to and through the electrode rod of the apparatus by the switching of FIG. 17a;

FIG. 17d is an alternate plot of Switching v. Time for an alternate embodiment of operation of the power source of FIG. 16;

FIG. 18d is a photograph of defects in an ESD coating in a surface view;

FIG. 18e is a photograph of defects in an ESD coating in another surface view;

FIG. 18f is a photograph of typical defects in an ESD coating in a cross sectional view;

FIG. 24 shows an ultrasonic power source for the embodiment of FIG. 21;

FIG. 27a shows a metallurgical comparison chart of coatings of different technology, FIG. 27a being a coating that is not ultrasonic-assisted;

FIG. 27b shows a metallurgical comparison chart of coatings of different technology, FIG. 27b being a coating that is not ultrasonic-assisted;

FIG. 28 is a micro-hardness comparison of different coating technology; and

DETAILED DESCRIPTION

Figure 1:
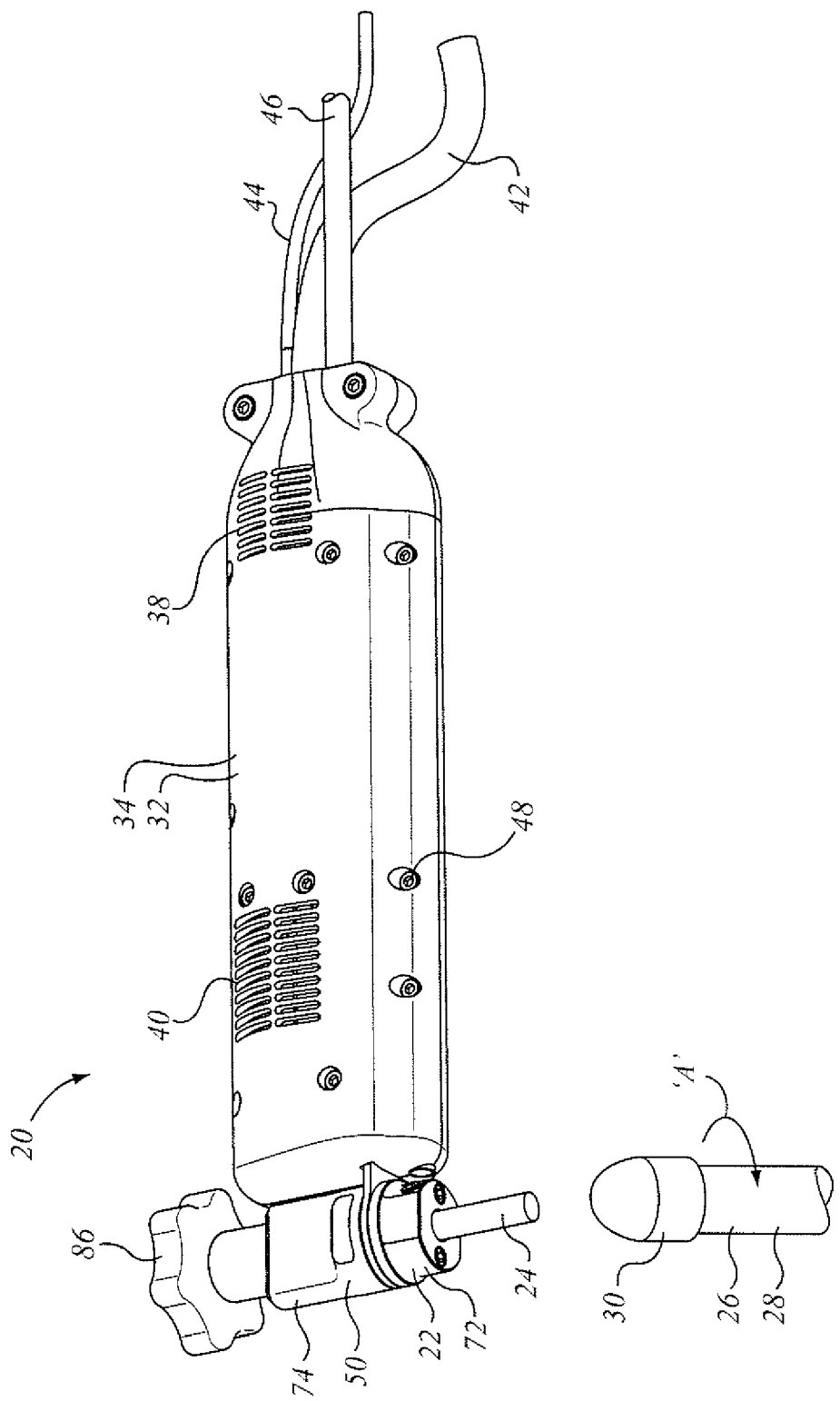
FIG. 1 is a general arrangement perspective view of an electrode handle apparatus according to an aspect of the invention herein.
Figure 2:
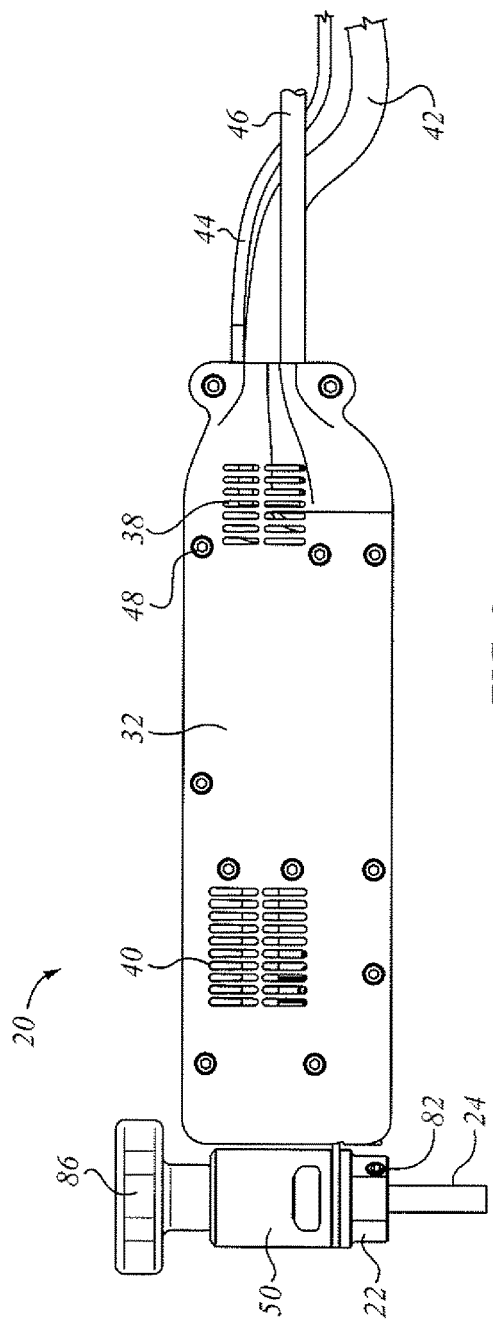
FIG. 2 is a first side view of the electrode handle apparatus of FIG. 1.
Figure 3:
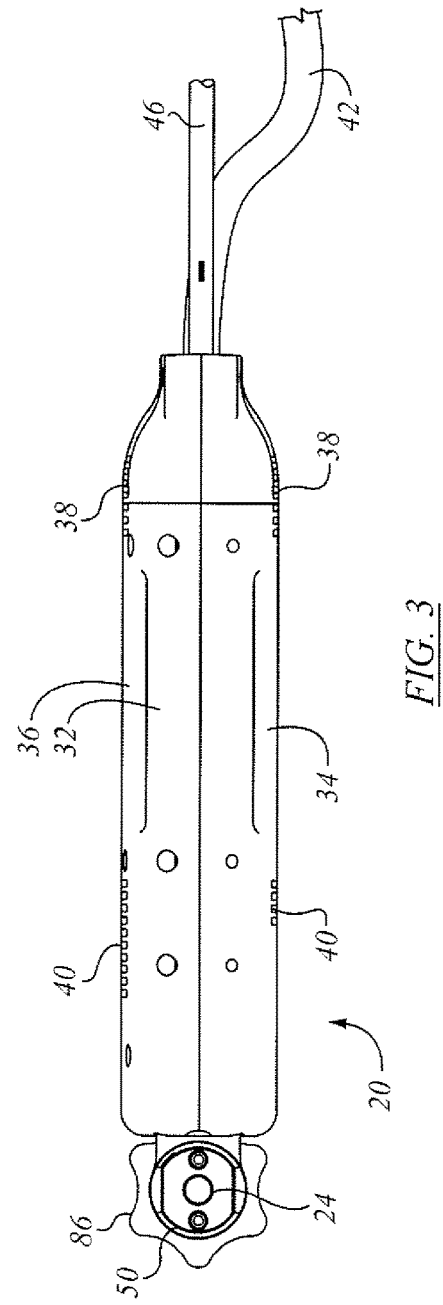
FIG. 3 is a top view of the electrode handle of FIG. 1.

The description that follows, and the embodiments described therein, are provided by way of illustration of an example, or examples, of particular embodiments of the principles of aspects and features of the invention. These examples are provided for the purposes of explanation, and not of limitation, of those principles and of the invention. In the description, like parts are marked throughout the specification and the drawings with the same respective reference numerals. The drawings may be taken as being to scale, or generally proportionate, unless indicated otherwise. The photographic views may be taken as being to scale, or generally proportionate, unless indicated otherwise.

The scope of the invention herein is defined by the claims. Though the claims are supported by the description, they are not limited to any particular example or embodiment, and any claim may encompass processes or apparatus other than the specific examples described below. Other than as indicated in the claims themselves, the claims may not be limited to apparatus or processes having all of the features of any one apparatus or process described below, or to features common to multiple or all of the apparatus described below.

The terminology used in this specification is thought to be consistent with the customary and ordinary meanings of those terms as they would be understood by a person of ordinary skill in the art in North America. Following from the decision of the Court of Appeal for the Federal Circuit in *Phillips v. AWH Corp.*, the Applicant expressly excludes all interpretations that are inconsistent with this specification, and, in particular, expressly excludes any interpretation of the claims or the language used in this specification such as may be made in the USPTO, or in any other Patent Office, other than those interpretations for which express support can be demonstrated in this specification or in objective evidence of record in accordance with *In re Lee*, (for example, earlier publications by persons not employed by the USPTO or any other Patent Office), demonstrating how the terms are used and understood by persons of ordinary skill in the art, or by way of expert evidence of a person or persons of experience in the art.

Reference is made herein to welding electrode tips and caps, which are intended to provide a generic example of a work piece that is movable with respect to at least one degree-of-freedom of motion while being coated. Other objects could also be coated. In respect of each tip or cap that is spinning on a mandrel, a polar-cylindrical co-ordinate system may be defined, in which the axial, or z-direction defines the axis about which the cap or electrode tip is formed, or has a surface, on a body of revolution, the term radial refers to a distance away from the z-axis, and circumferential refers to an angular direction about the z-axis. For generality, the workpiece may be other than a welding cap, and may be mounted for one or two degrees-of-freedom of motion in translation in, for example, an x-y plane in a Cartesian co-ordinate system or frame of reference. That motion may be reciprocating or cyclic motion, and may include both rotational and translational components.

By way of general overview, an electrode handle apparatus, or simply a handle, is shown in FIG. 1 as 20. Apparatus 20 has an electrode holder, indicated generally as 22, in which an electrode 24 is mounted. Electrode 24 has a cylindrical shape, and is relatively long and thin. Electrode 24 may be a semi-conducting material, such as titanium carbide, titanium di-boride, or such other material as may be. The outwardly extending tip of electrode 24 is seen positioned toward an object apparatus 26, which includes a mandrel 28 upon which is mounted a workpiece to be coated, such as may be a welding electrode cap 30. By the nature of the coating process, electrode rod 24 is consumable and replaceable. The mandrel, or support fitting, or jig, or fixture, upon which the workpiece is mounted has at least one degree of freedom of motion. In the example shown, the degree of freedom of motion is rotational motion about the longitudinal axis of mandrel 28, such that cap 30 is spinning, as notionally indicated by arrow 'A'. As noted above, in general a workpiece may be mounted on a seat or jig and moved in some manner be it rotational or translational in the x-y plane. Mandrel 28 and apparatus 22 are both connected to an electrical power source, such that they are of opposite polarity. When electrode 24 is brought into contact with electrode cap 30, electric current will flow between them. Inasmuch as current flow is initiated by a spark as the two parts come into proximity, and inasmuch as both parts are moving, contact may be intermittent, and at each contact a portion of electrode 24 may melt or otherwise be deposited upon cap 30. As cap 30 spins and electrode 24 makes and breaks contact, the top of cap 30 becomes coated with the electrode material. Cap 30 may be a copper cap, it may have a first coating of nickel; and the TiC or $TiB_2$, or other coating material, may be laid down on top of the nickel. Handle apparatus 20 may be a vibrating apparatus, such that the tendency to make and break contact with the object workpiece is enhanced.

Figure 6:
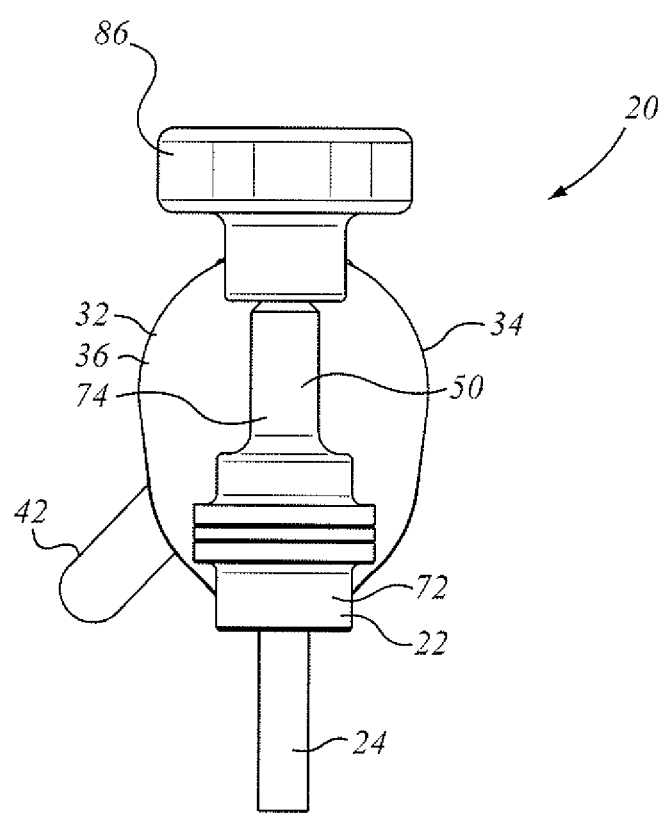
FIG. 6 is an end view of the electrode handle apparatus of FIG. 1.

Considering again apparatus 20, there is housing, or backshell, or haft, or body generally indicated as 32, that housing including first and second portions 34, 36, which may be referred to as backshell halves. First and second housing portions 34, 36 are held together by an array of fasteners such as may be in the nature of threaded cap screws 48. Both backshell halves may have porting in the nature of vents such as inlet vent array 38 and outlet vent array 40, by which air or other gas coolant may be admitted to, and enabled to depart from, the interior of housing 32. The backshell halves may be made of an electrically non-conductive, or electrically insulating, material. The girth of housing 32 may be suitable for being grasped in the hand of an operator. Although not necessarily circular in section, as seen in FIG. 6, the general proportions of housing 32 are that it may have a through dimension of the order of 2 inches.

At the connected end, housing 32 has three input connections, the first input being an electrode power connection, which may be a DC power connection, indicated as 42, and which may, ultimately, be connected to an ESD power source—the same power source of which the opposite pole is connected to mandrel 28. The power source may be indicated generically as a power supply 200, discussed below. The second input is a motor power source 44 for operation of an electric motor within housing 32, in the form of a power cable which may be 120V AC 60 Hz. or 220 V AC 50 Hz, or a 12V DC source, or such other source as may be, and could be a pneumatic source. The power may in some embodiments also be provided by power supply 200. The third input is a cooling line 46, such as may be an air line. At the free end of housing 32 (i.e., the end distant from the three connection inputs) is the tool holder assembly, indicated generally as 50, and described in greater detail below.

Figure 4:
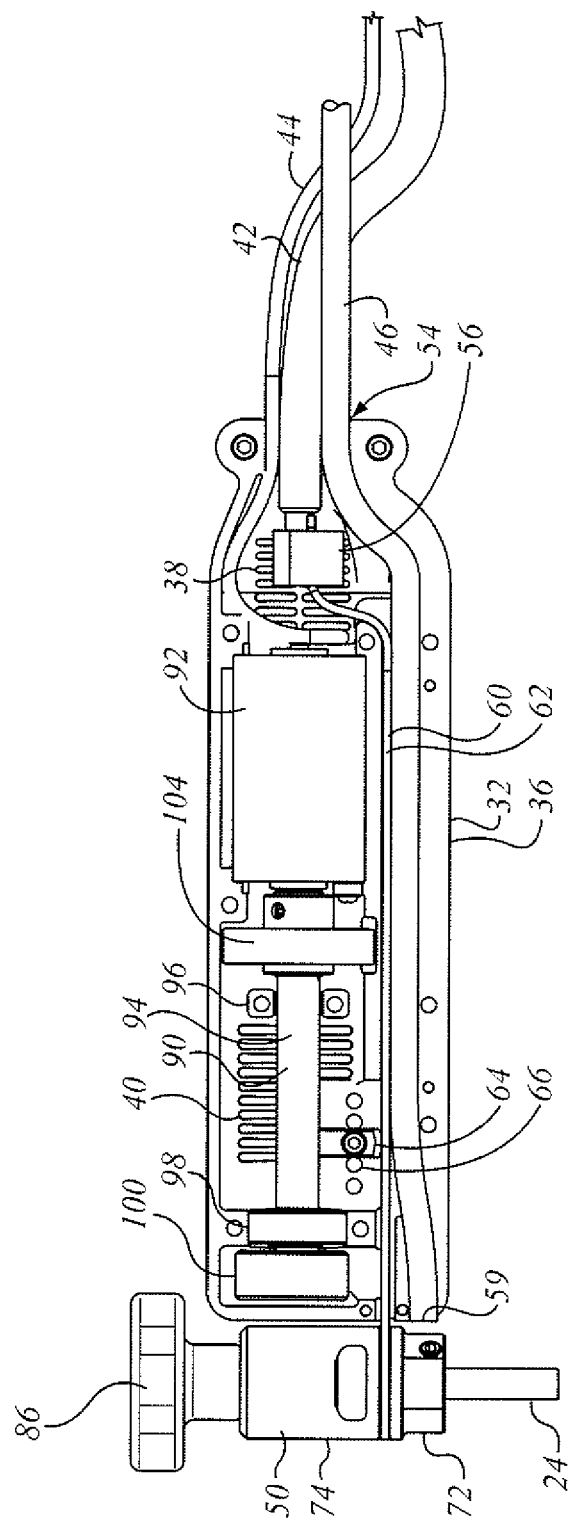
FIG. 4 is a side view of the electrode handle of FIG. 2 with the near-side handle haft removed to expose interior features.
Figure 5:
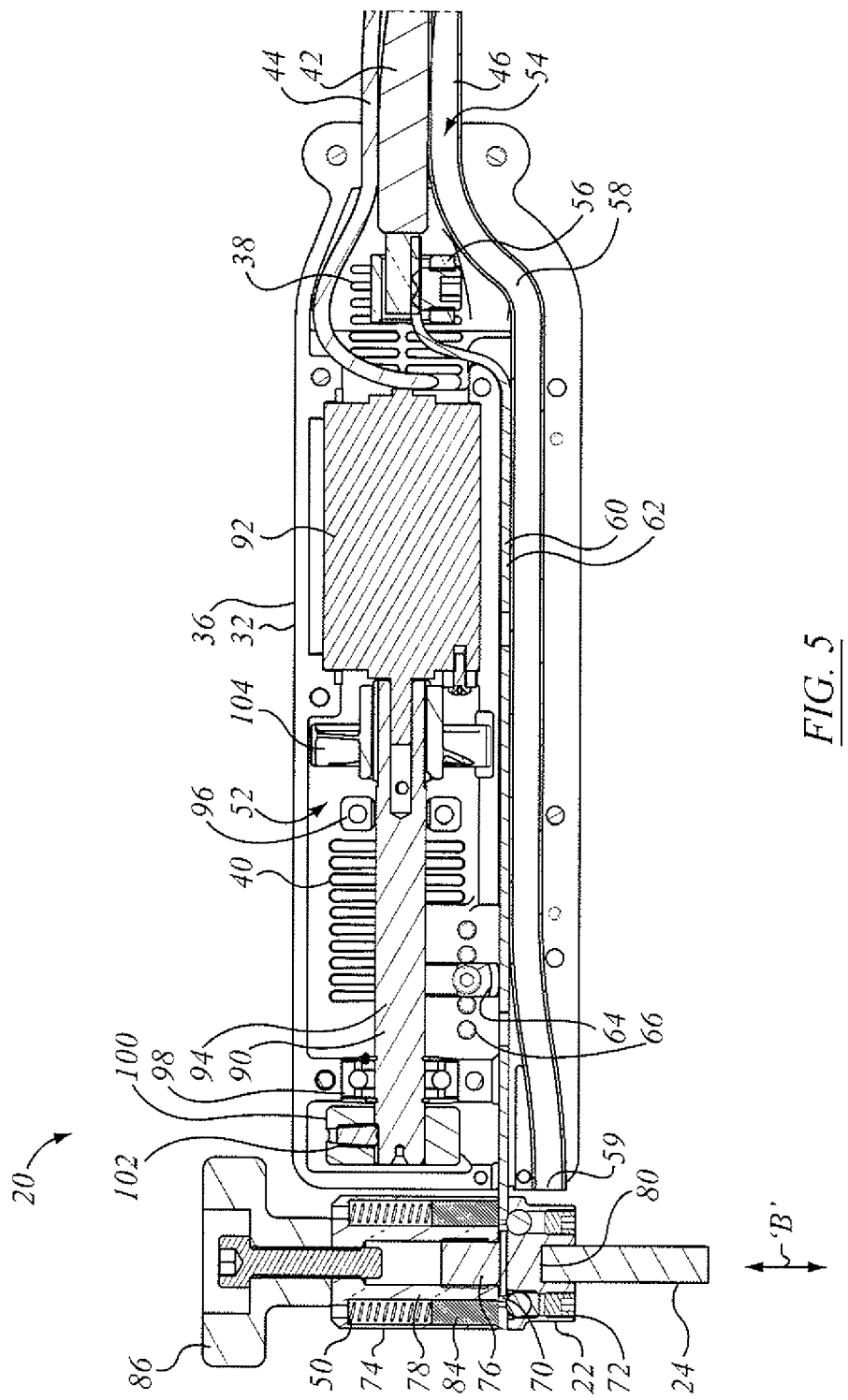
FIG. 5 is a longitudinal cross-sectional view of the electrode handle of FIG. 2.

Considering FIGS. 4 and 5, an internal machinery space 52 is defined within the two halves or portions 34, 36 of housing 32. The inputs pass into housing 32 at an opening 54. Opening 54 may be located at the first end of housing 32. It may be that roughly half of each opening is formed in each portion of the housing, the perimeter of the opening being closed together when the halves are assembled. There could, alternatively, be a separate opening for each input as may be, and such an opening or penetration could be formed entirely in one half the shell. The main power cable, namely that of electrode power connection 42, is secured at a terminal lug 56 inside housing 32, adjacent to opening 54. The coolant conduit may have the form of a hollow pipe 58 that is formed to run along the inside proximal margin of housing 32, with an outlet 59 oriented toward tool holder assembly 50 adjacent the seat of electrode 24. Coolant conduit 58 may be used to carry air as a cooling fluid, or, alternatively, it may be used to conduct an inert gas, such as argon, to electrode rod 24, and, whether used for cooling or not, may be used for the alternate purpose of providing an inert gas shielding to the coating process. That portion of pipe 58 lying outside of opening 54 may be made of a non-electrically conductive material such as a plastic tube. That portion of pipe 58 lying within housing 32 may be made of a metal, such as copper, aluminum, stainless steel, mild steel, or such other metal as may be suitable, those metals tending to have higher thermal conductivity than plastic pipe.

Also connected at terminal lug 56 is a predominantly lengthwise-extending member defining a transmission 60. Assembly 50 is mounted to the far end of transmission 60. Transmission 60 may have the form of a lever or spring or beam 62. The first end of the spring or beam is secured at terminal lug 56, as indicated. The main or medial portion of transmission 60 may lie next alongside pipe 58 and may be contained between pipe 58 and a fulcrum 64 located intermediate the first and second ends of transmission 60. In the embodiment illustrated, fulcrum 64 is located closer to tool holder assembly 50 than to lug 56. The position of fulcrum 64 is adjustable according to the various positions of an array of mounting fittings, which may be threaded blind sockets, indicated generally as 66. If the length of transmission 60 from the center of lug 56 to the axial centerline of tool holder assembly 50 is designated as "L", the position of fulcrum 64 may be in the range of about ⅗–⅘ of L from lug 56 to assembly 50. That portion of transmission 60 lying beyond fulcrum 64, i.e., between fulcrum 64 and tool holder assembly 50, is a cantilever. Tool holder assembly 50 acts as a concentrated mass at the end of the cantilever. Transmission 60 so restrained has a configuration like a spring-board or diving board.

Tool holder assembly 50 has a first portion 72, and a second portion 74. The distal end of transmission 60 has an aperture formed therethrough so male portion 76 of first portion 72 can mate with the female portion 78 of second portion 74, with the end of transmission member 60 sandwiched therebetween. It is arbitrary which of portions 74 and 76 is male and which is female, the parts are joined in a connection. As mated together, tool holder 50 is rotatable about its long axis to permit electrode 24 to be turned. First portion 72 may be a locking socket or chuck defining the seat 80 for electrode 24, and may have tightening or securing members, such as a grub screw 82. Second portion 74 includes spring-biased graphite brushes 84. A handle 86 is mounted to second portion 74, the handle having an appropriate grip by which it may be turned, such as by a person wearing gloves. Handle 86 may be made of an electrically insulating material, such as a cast plastic. First portion 72 and second portion 74 are both electrically conductive, and may be made of copper or a copper alloy. Consequently an electrically conductive path is completed from electrical power connection 42 through transmission 60, through brushes 84, through second portion 74 and first portion 72, and into electrode 24.

Also within housing 32 is a vibration assembly, or oscillator, or shaker, or motion exciter such as may be identified as 90. It may include a motor 92, which may be an electrical motor connected to motor power source 44. Motor 92 may drive an output shaft 94 that passes through near and far bearings 96, 98. An eccentric 100 is mounted to shaft 94, such as at the distant end thereof. Eccentric 100 may be a disc with either an unbalanced weight or an unbalanced cavity indicated at 102, such that when shaft 94 rotates, assembly 90 vibrates. The resultant vibration has an amplitude having a component in the axial direction of electrode rod 24. An air moving device, such as a fan blade, or impeller 104 is mounted to shaft 94, and, as shaft 94 turns impeller 104 draws air in through inlet vent array 38, and urges it out through outlet vent array 40. In an alternate embodiment, the direction of the airflow may be in the opposite direction.

In use, an operator grasps housing 32, and uses electrode 24 much like a pencil to paint or coat the workpiece object. While this is occurring, the rotation of eccentric 100 causes apparatus 20 to vibrate, which, in turn, causes electrode 24 rapidly and repeatedly to make and break contact with the work piece. With each oscillation there is a new spark and deposition of the material of electrode rod 24 onto the workpiece.

Vibration assembly 90 provides a forcing function input to transmission 60. Transmission 60 is not merely an electrical conductor, but also a mechanical conductor or resilient transmitter in terms of transmitting an input impulse, or wave-train of impulses. The force and displacement transmissibility of transmission 60 of the mechanical motion of the forcing function input to electrode holder 50 is dependent upon the natural frequency of the vibrational degree of freedom of interest. For example, in assembly 50 the axial direction of electrode 24, that direction being the same direction as the dominant vibration mode of the spring board or beam of transmission 60 as it flexes outboard of fulcrum 64. Although the axis of the cylindrical rod of electrode 24 is shown as being perpendicular to the long axis of apparatus 20, this need not necessarily be so. In another embodiment, electrode 24 may have the form of a rod having an axis parallel to, or concentric with, the main body of housing 32.

The handle apparatus drives the consumable electrode 24 to vibrate in a first degree of freedom of motion in longitudinal or predominantly longitudinal movement (i.e., having a component of motion, possibly a predominant component of motion in the direction of the longitudinal axis of the electrode rod) relative to the metallic surface being coated or treated in the process. The longitudinal force or displacement is generated by attaching an eccentric circular metal load to a spinning motor. The positioning of the eccentric weight determines the pounding or contact force when the contacts are made. The frequency of vibration is controlled with the speed of the motor to which the eccentric weight is mounted, and the amplitude of vibration may be affected by the placement of the fulcrum. The longitudinal movement of the consumable electrode in a direction that includes a component of motion, and usually a predominant component of motion, normal to the surface to be treated, allows the periodic contacts to be made with the metallic surface of the workpiece. This occurs while that workpiece surface is being driven in a second degree of freedom of motion. The combination of motions, and the vibration-driven urge to make and break contact, may result in a relatively stable or consistent sequence of electro-sparks (when the contacts open) and depositions of coating material (when the open contacts approach) that take place in the process. The vibrating motion is, or includes, motion normal to the surface being coated, and occurs at the same time as the surface is being moved in another degree of freedom, e.g., as by rotating about an axis, or by translational movement relative to the normal direction, such as to bring a "fresh" portion of the work piece under the coating rod.

This process may be compared with a known process in which only the workpiece is moving, e.g., by rotation, and the coating electrode rod is held against the surface, or in which the workpiece is stationary, and the electrode rod is spinning about its axis. The coating material tends to be much harder than the copper or other material being coated (which, if copper, may itself have a nickel overlay). In the existing process, there may be a grinding effect of the hard coating material, tending to remove the soft material in the ESD process, including a fair portion of the previously deposited coating material that one might wish to retain. Such a process may not be as efficient as might be desired. By contrast, the axial vibrating motion of rod 24 normal to the surface may tend to facilitate relative translation of the workpiece between electrosparks, possibly without the same grinding effect, and perhaps with a greater output yield for a given quantity of coating rod consumed.

Figure 7:
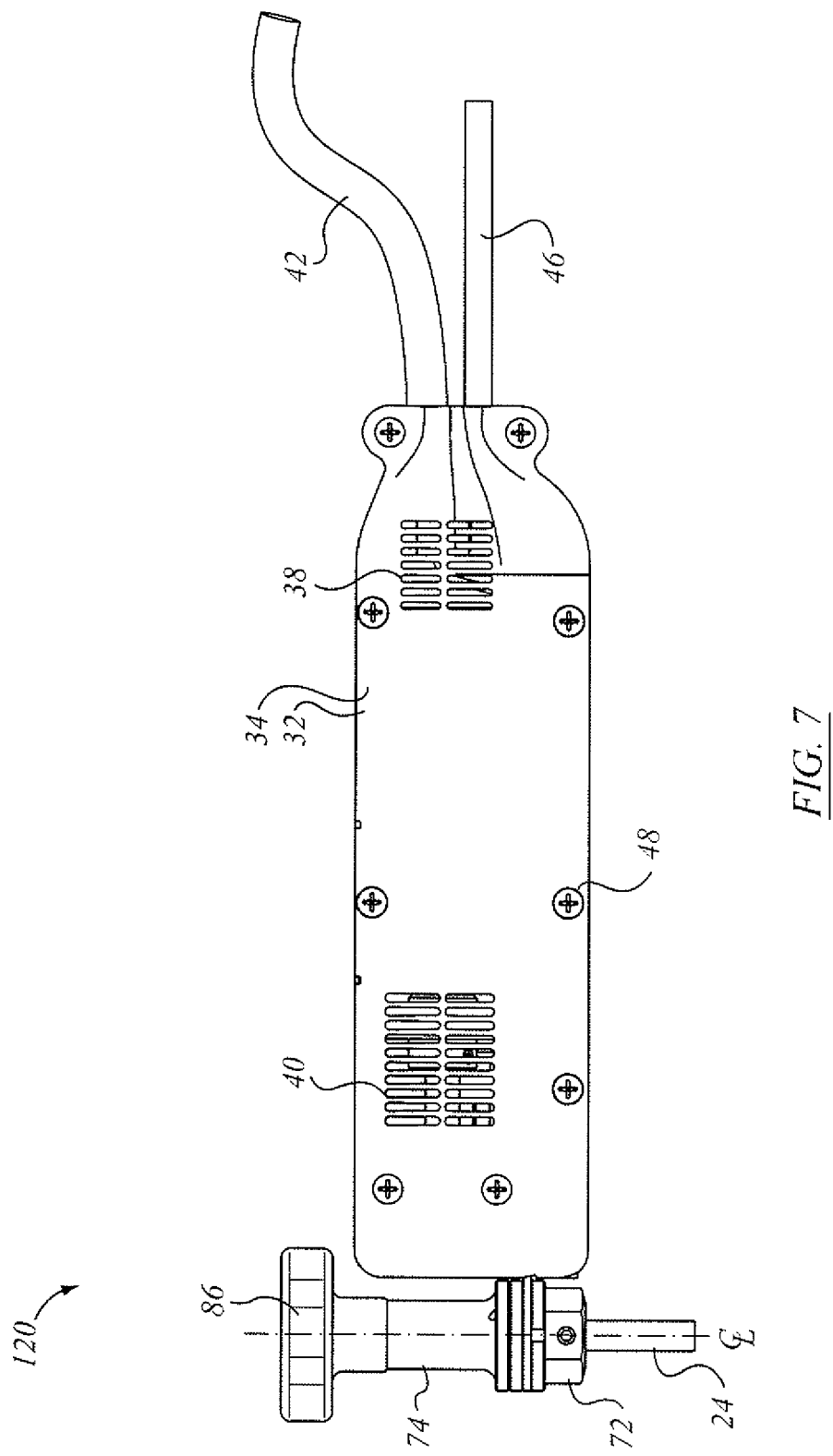
FIG. 7 is a side view of an alternate embodiment of electrode handle to that of FIG. 1.
Figure 8:
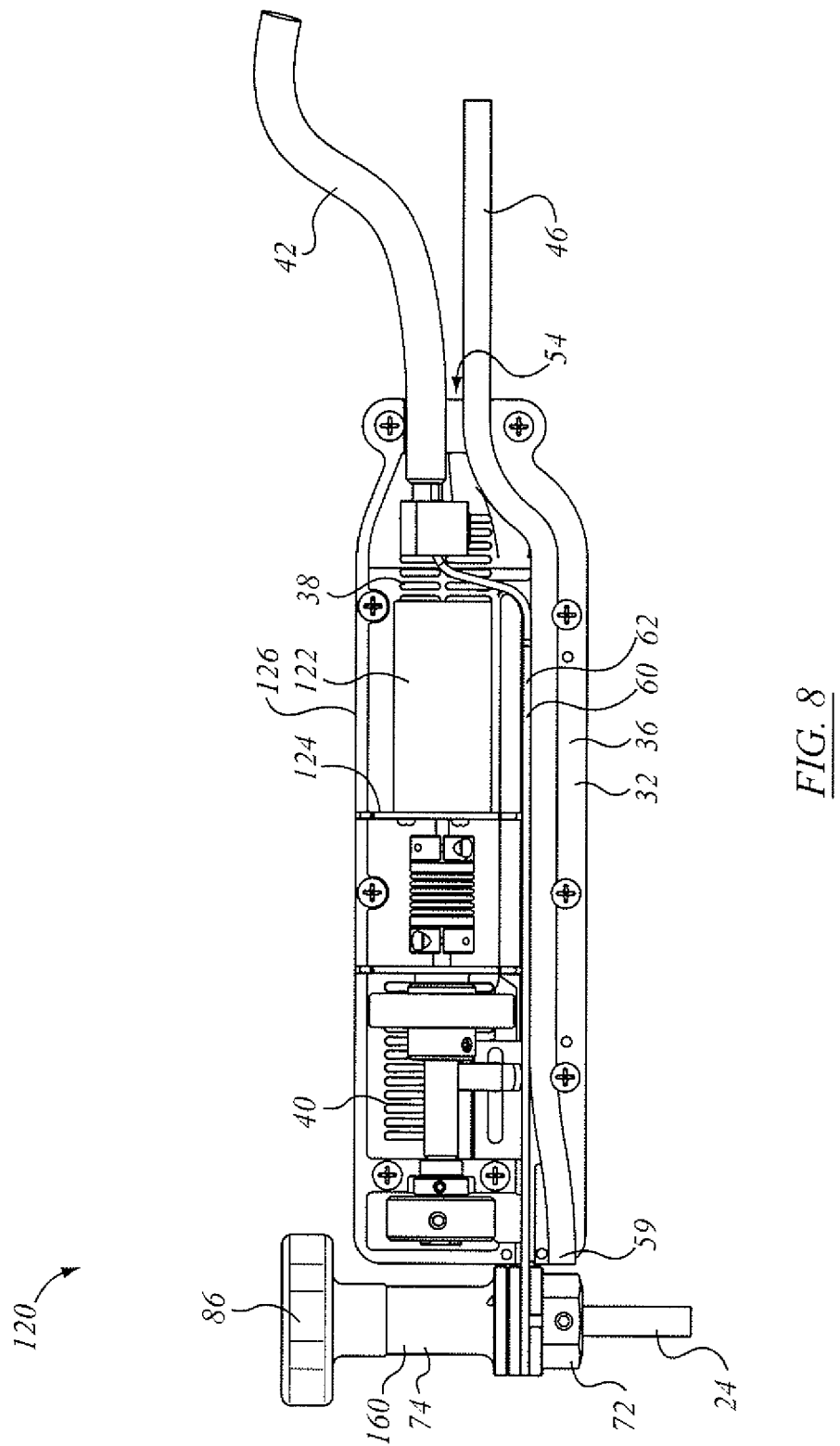
FIG. 8 shows the electrode handle of FIG. 7 with the near side of the housing removed.
Figure 9:
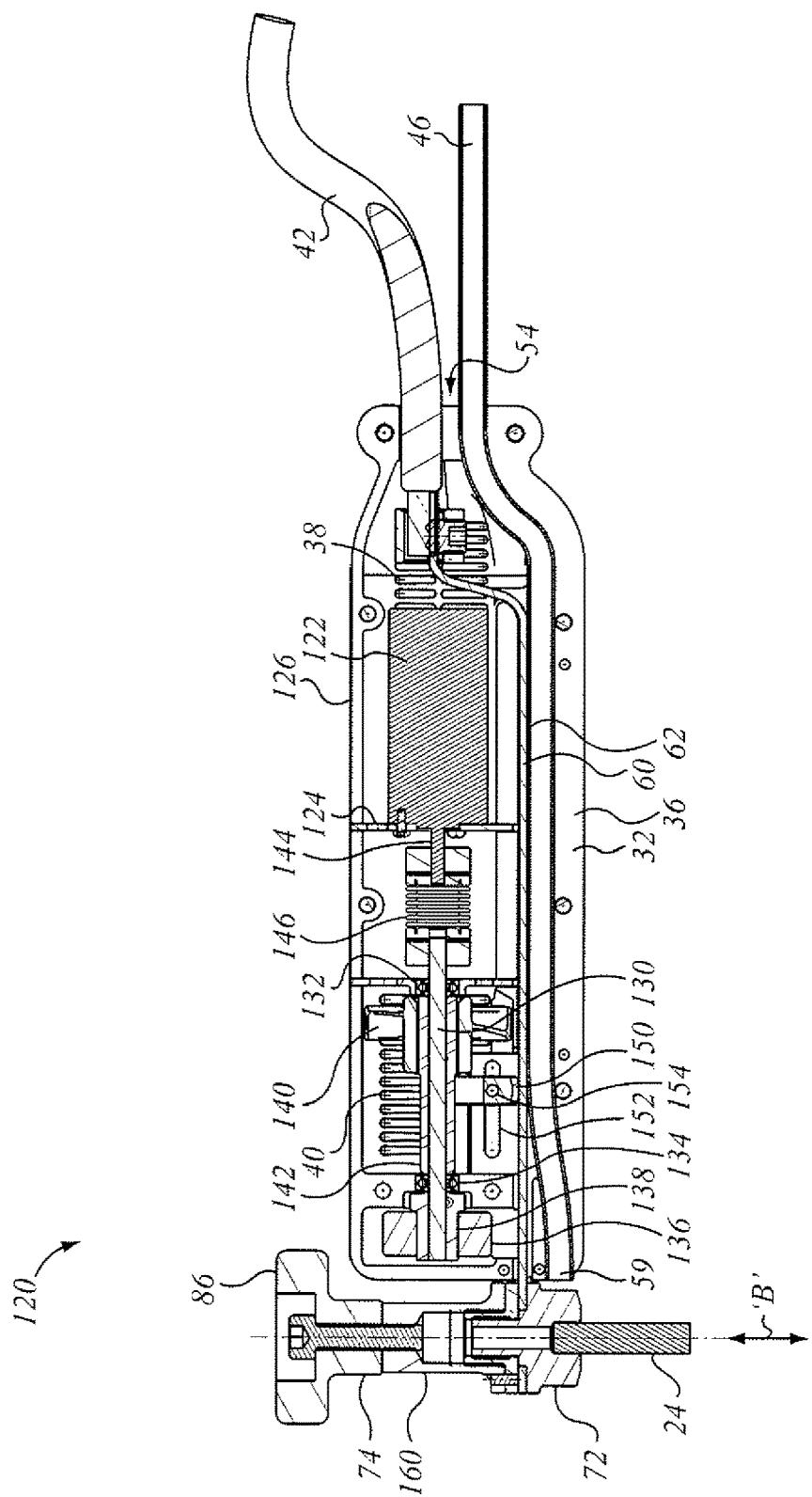
FIG. 9 shows a cross-section of the electrode handle of FIG. 7 along its longitudinal central plane.
Figure 10:
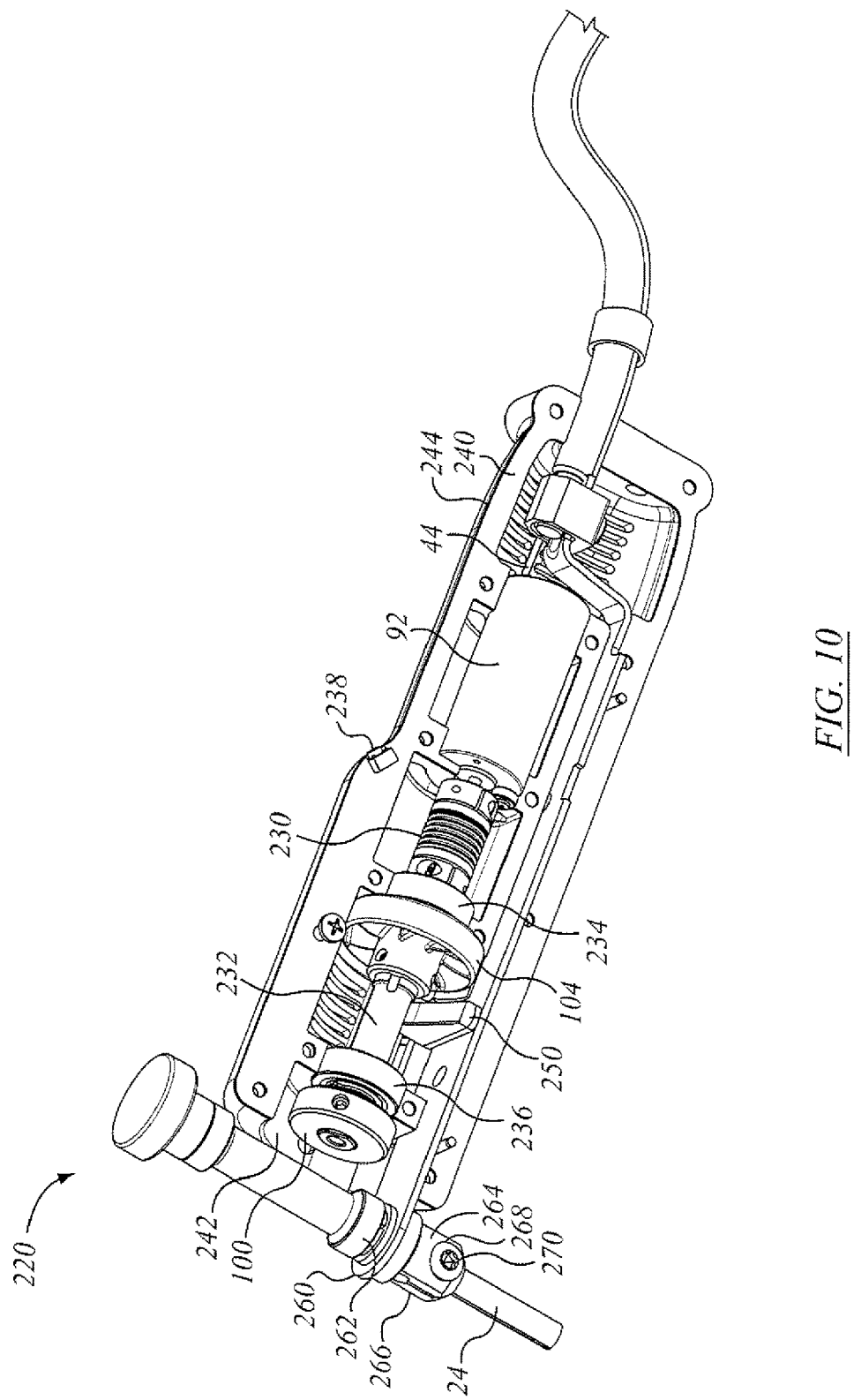
FIG. 10 shows a general arrangement perspective view of an alternate electrode handle apparatus to that of FIG. 1.
Figure 11:
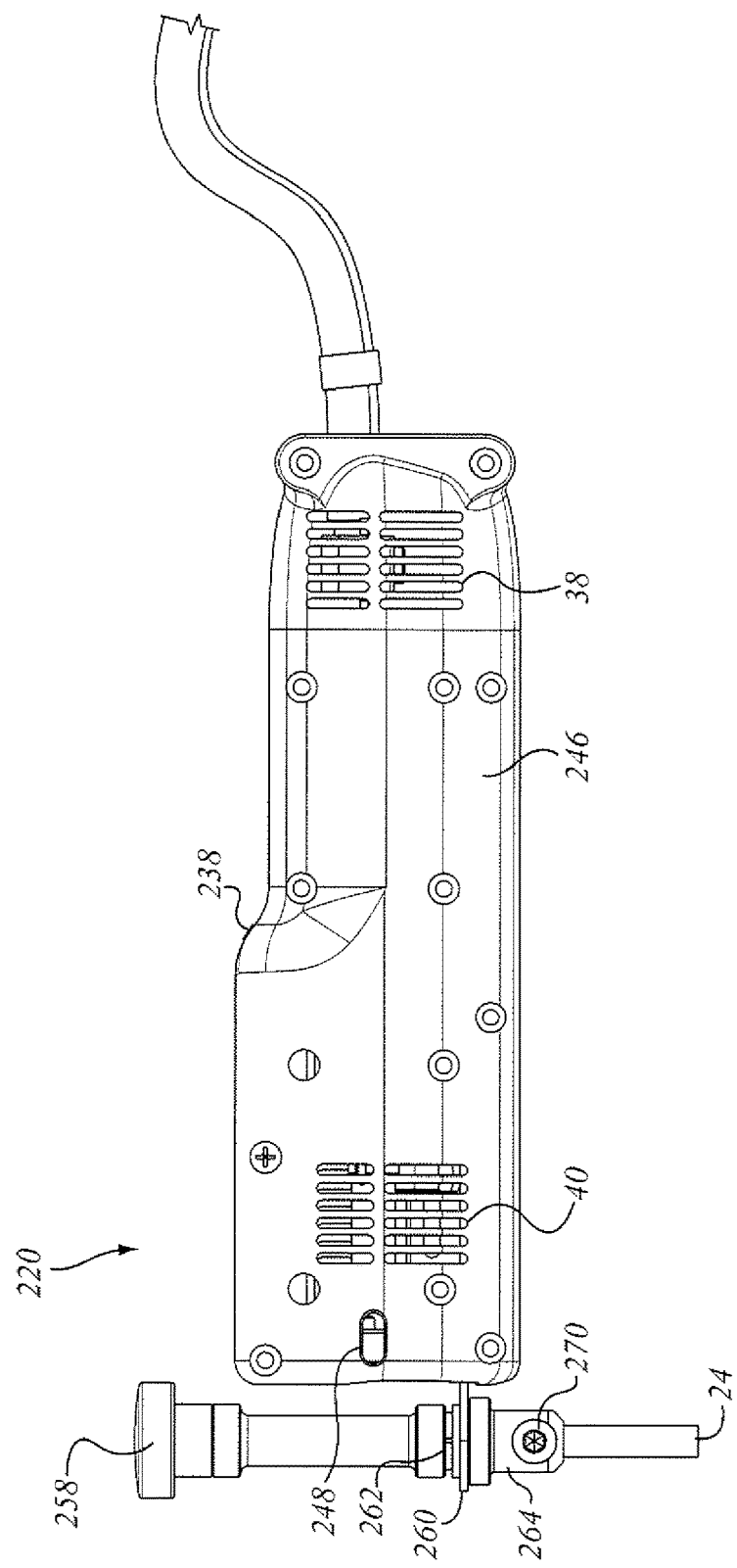
FIG. 11 is a first side view of the electrode handle apparatus of FIG. 10.
Figure 12:
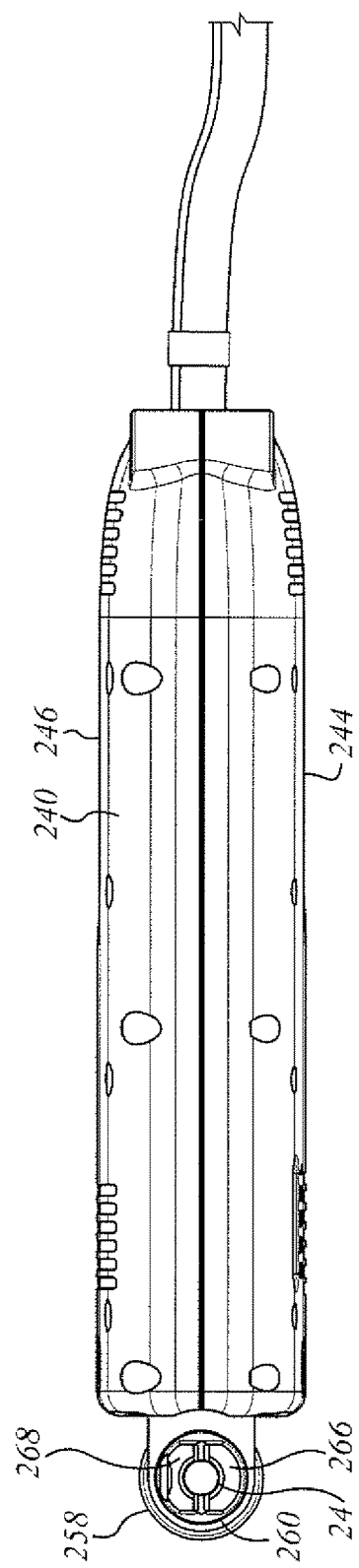
FIG. 12 is a bottom view of the electrode handle of FIG. 10.

The embodiment of electrode handle apparatus 120 of FIGS. 7-9 is substantially similar to the embodiment of electrode handle apparatus 20 of FIGS. 1-6, and, to the extent applicable, common parts are identified by common part numbers. Apparatus 120 differs from apparatus 20 to the extent of employing a servo motor 122 carried on a motor mount 124 seated in housing 126. Servo motor 122 may be a brushless DC (BLDC) servo motor. Servo motor 122 is a variable speed motor. A separate shaft 130 is carried in a first, or mid-position bearing 132 and a second or distant position bearing, or pilot bearing 134. An imbalance weight 136 and adapter 138 are mounted on the distal end of shaft 130 (i.e., the end distant from motor 122), and correspond to eccentric 100. An impeller 140 and impeller adapter 142 are mounted to shaft 130 between the front and mid bearings (i.e., bearings 134 and 132). The proximal end of shaft 130 is connected to the output shaft 144 of motor 122 by a flexible coupling 146. Flexible coupling 146 may tend to isolate motor 122 from radial loads on shaft 130.

Further, apparatus 120 has a movable fulcrum 150 that is externally accessible, and adjustable by means of access slot 152 and set screw 154. As previously, the ability to move fulcrum 150 longitudinally toward tool holder assembly 160 may tend to permit the cantilevered portion of transmission 60 to be choked down, both by shortening the length of the cantilever, and by constraining its lateral motion. Fulcrum 150 may, in that sense be said to choke down, or damp down, the amplitude of vibration of tool holder assembly 160 in direction namely the axial direction of rod 24.

An alternate electrode handle apparatus 220 is shown in FIGS. 10-14. Apparatus 220 may be taken as being the same, or substantially the same as apparatus 20, to the extent that similar parts may be indicated with the same item numbers, and the foregoing description may be taken to apply to the features of apparatus 220.

Apparatus 220 differs from apparatus 20 in a number of features. As preliminary points, although apparatus 220 does not show a third input, namely cooling line 46, it may be understood that apparatus 220 may include such a line in other embodiments. Electrical power connection line 44 feeds electrical power from a power source to motor 92. Apparatus 220 includes a flexible couple or connection or clutch or damper, indicated as connection 230. Connection 230 may include a spring or resilient member such as may tend to provide a dynamic filter between motor 92 and the eccentric weight 100. Connection 230 is mounted to the output shaft of motor 92. Driven shaft 232 is connected to, and extends from connection 230 to an impeller 104, and, in turn, to eccentric weight 100. As motor 92 turns, impeller 104 draws ventilating air through inlet apertures or vents or ports 38, across motor 92, and forces it out exhaust ports 40. Driven shaft 232 is carried in front and rear bearings 234 (axially near motor 92) and 236 (axially more distant from motor 92), with weight 100 being mounted axially outboard of bearing 236. The axial spacing of bearings 234 and 236 may provide a long moment arm, and may tend to aid in resolving the eccentric imbalance into the housing, or housing body, 240 through bearings 234 and 236 rather than through the bearings of motor 92. Motor 92 may have an on-off switch or speed control as shown on the dorsal portion of apparatus 220 at 238.

Housing body 240 may be open at the head or front end, (i.e., the end nearest electrode 24) as at 242. Housing body 240 may have left and right hand parts of halves 244, 246, that fit together, as above, and that may have indexing pins and blind sockets for that purpose. One or the other of halves 244, 246 may include an access port or keyway 248 through which a tool, such as a screw driver, socket, wrench, or Allen key, may be introduced to tighten or loosen the securing fastener, such as a grub screw, of eccentric weight 100. To the extent that end 242 is open, eccentric weight 100 may then be removed or replaced, as may be desired or suitable for the speed of operation such as may be set or adjusted with speed control 238.

Figure 13:
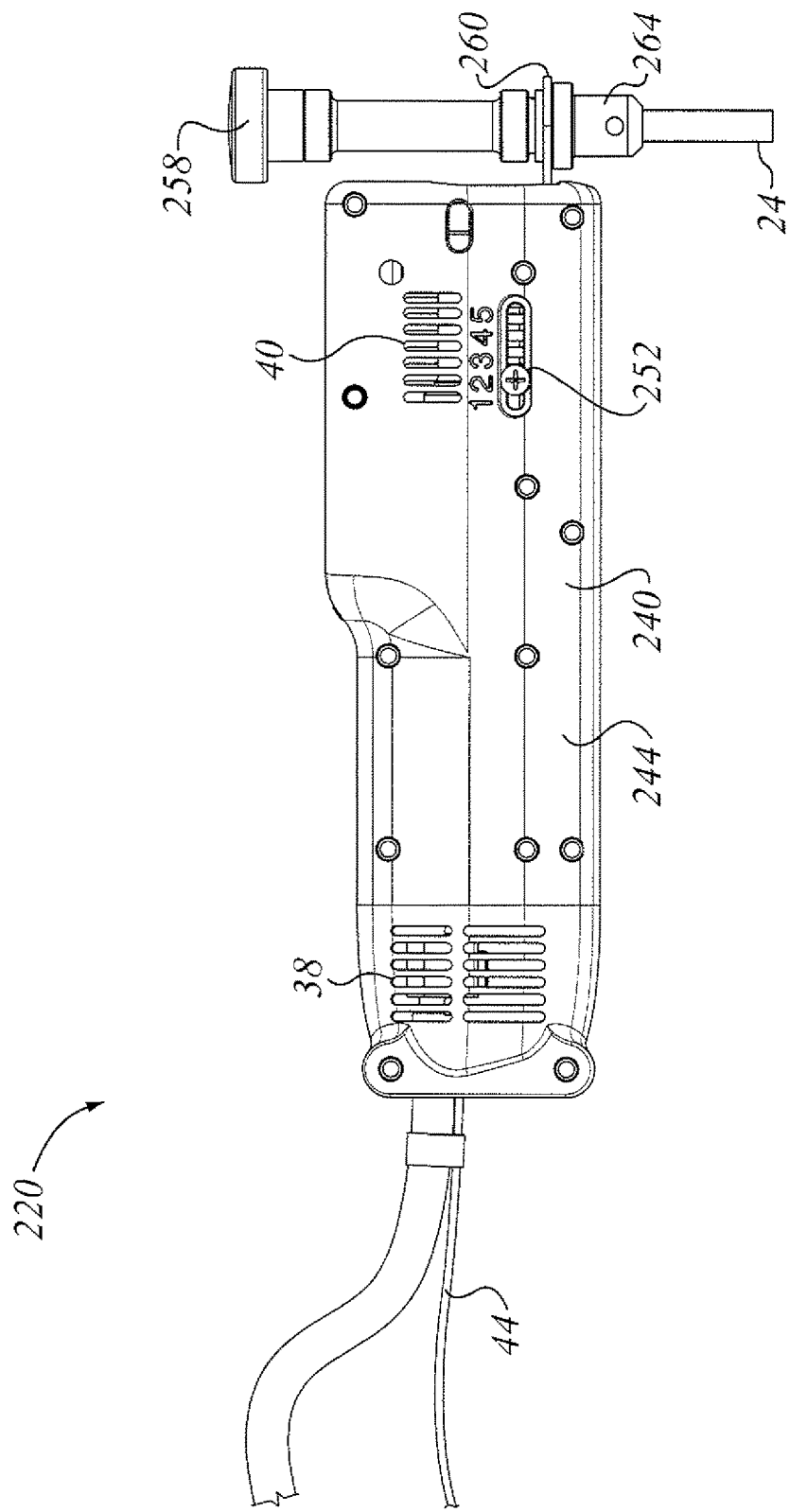
FIG. 13 is an opposite side view to that of FIG. 11.
Figure 14:
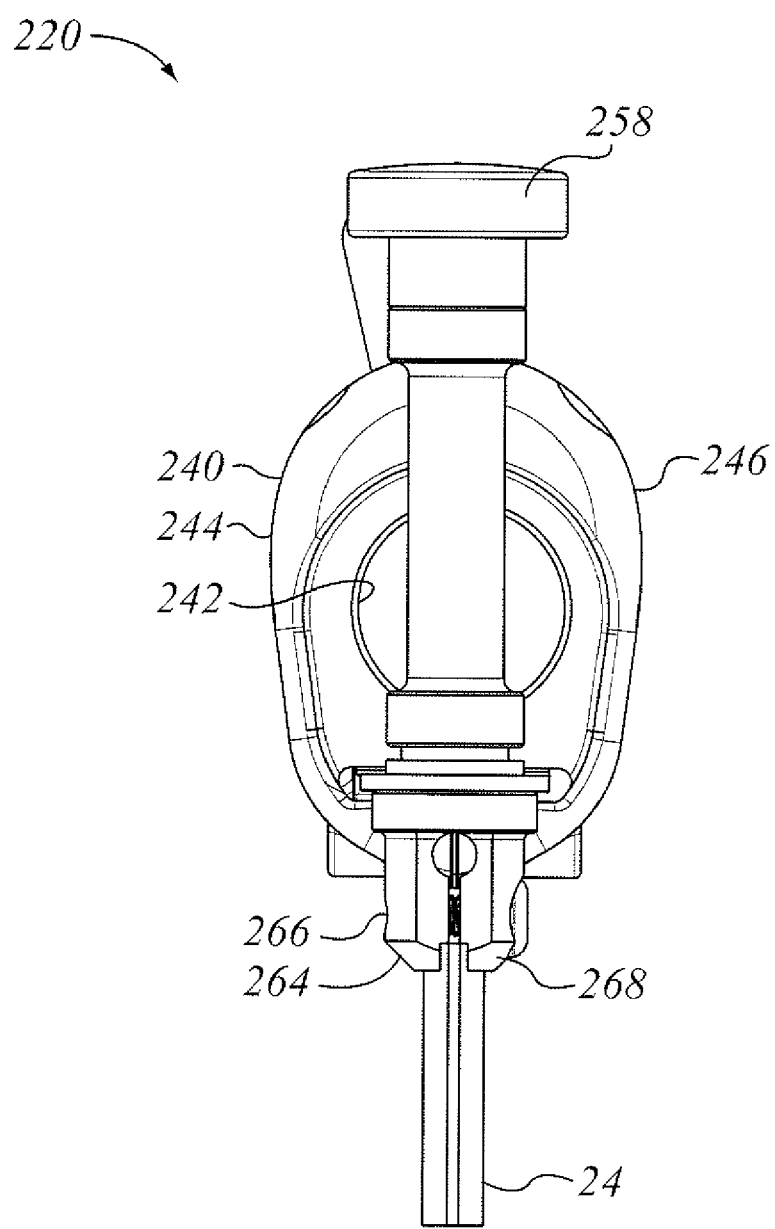
FIG. 14 is a head end view of the apparatus of FIG. 10.

Further, apparatus 220 may include an externally adjustable fulcrum, or seat, or snubber, or damper 250 that, when secured, bears against the motion transmitting member to which electrode 24 is mounted, such as spring 62. In essence, damper 250 functions as a guitar fret, changing the natural frequency of the cantilever of spring 62, and also as an amplitude limiting device, to the extent that damper 250 confines spring 62. Damper 250 may include a rubber (or other polymer or elastomer) body, and may have a wedge shape. The fastener 252 of damper 250, and its range of adjustable locations, is seen in FIG. 13.

Further still, apparatus 220 includes a different electrode holding fitting or seat, 260. While handle 258 may still be rotated about its longitudinal axis by virtue of its rotatable mounting 262 to spring 62, a split collar 264 has left and right jaws 266, 268 that seize upon the end of electrode 24, and are secured by a chuck, or lock, or lateral fastener 270. The jaws of apparatus 220 may tend to hold a smaller portion of rod 24 than the fitting of apparatus 20, thus tending to reduce the wastage of the expensive sintered coating composition rods.

Figure 15A:
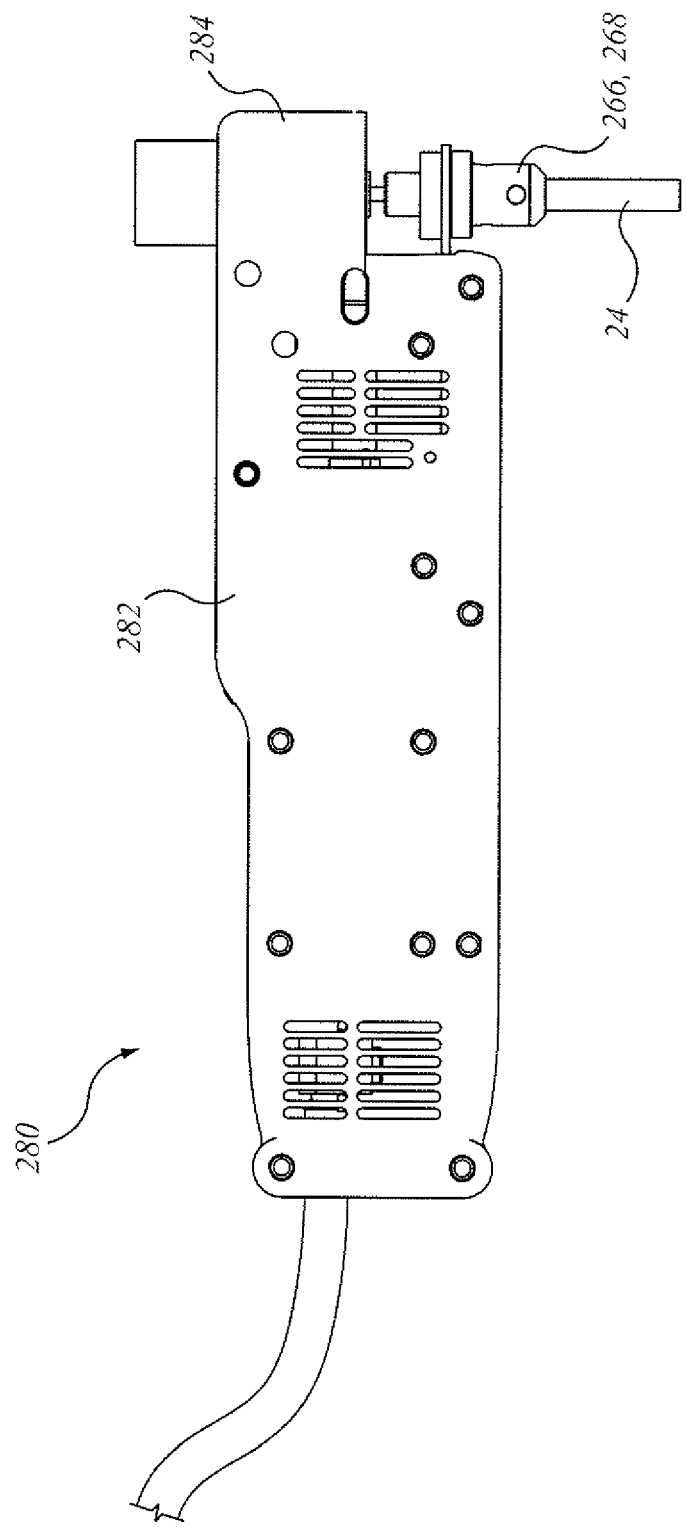
FIG. 15a shows a first side view of an alternate apparatus to that of FIG. 1.
Figure 15B:
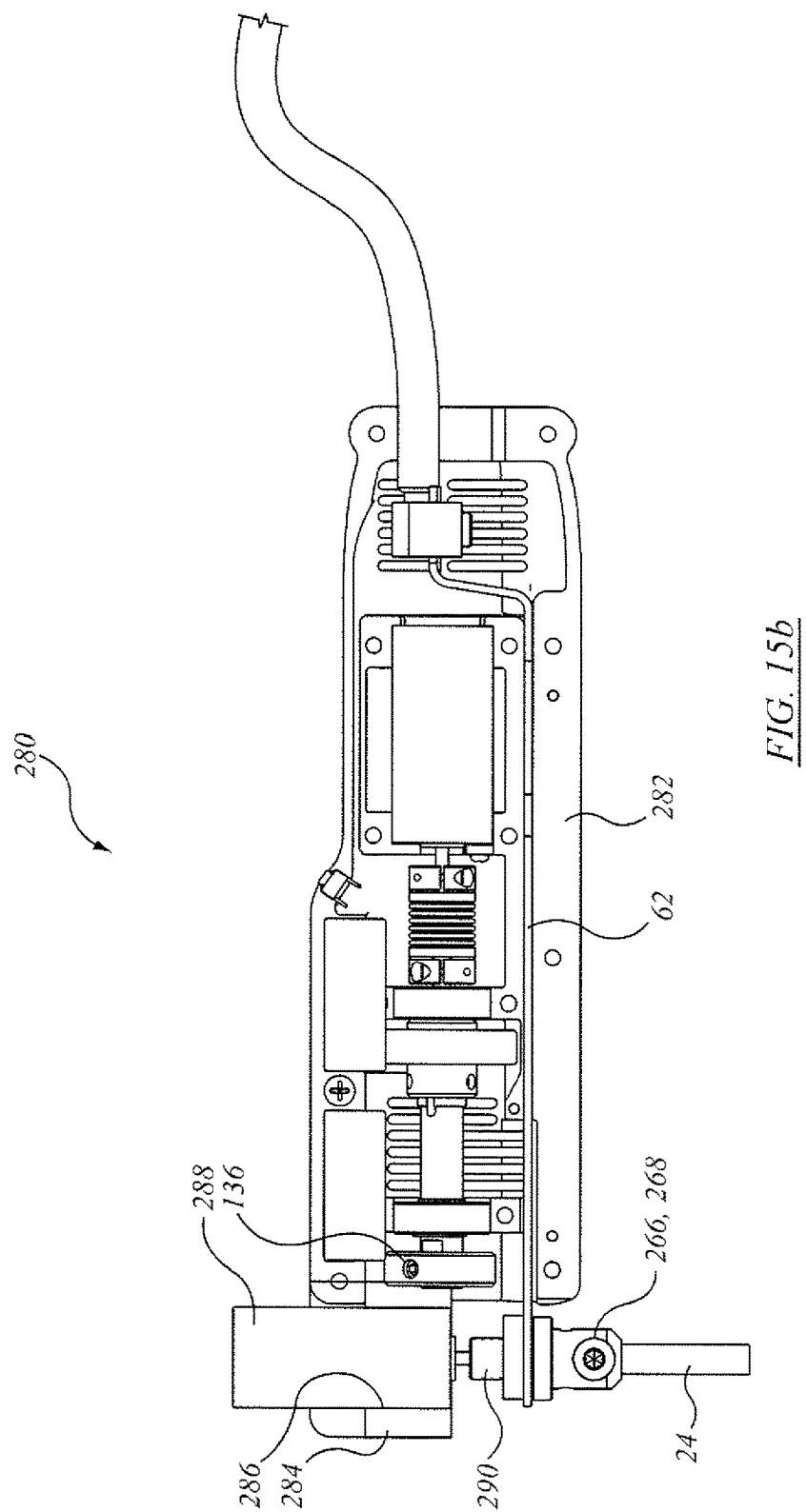
FIG. 15b show a second, opposite side view of the apparatus of FIG. 15a with the foreground housing removed to reveal interior detail.
Figure 16:
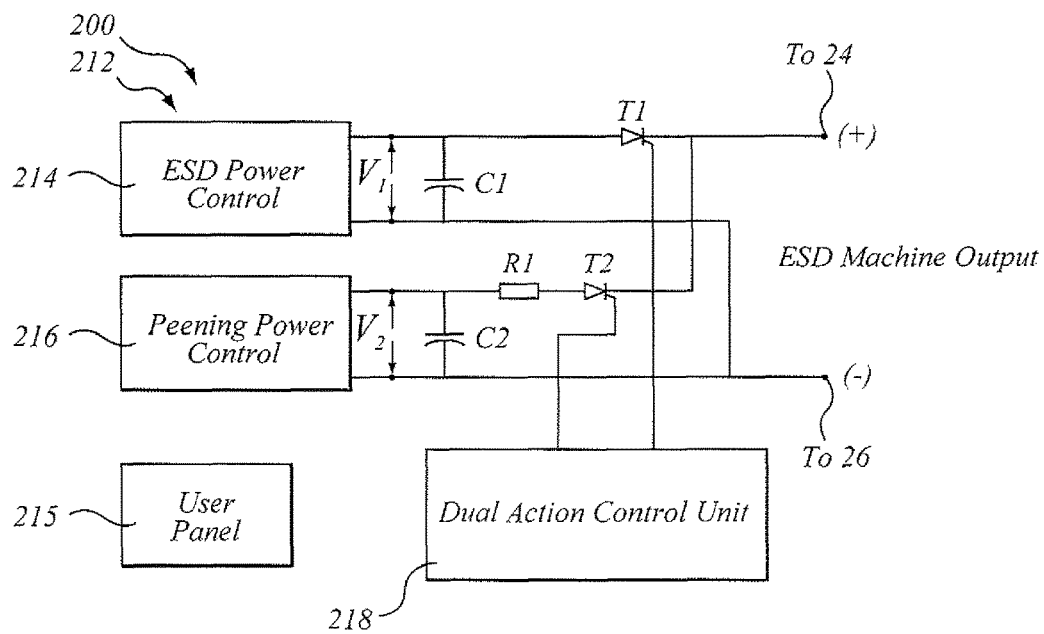

A further alternate embodiment is shown in FIGS. 15a and 15b in which there is a vibrating handle apparatus 280. Apparatus 280 is substantially the same as apparatus 220, and may be taken as being the same except as noted. Apparatus 280 differs from apparatus 220 to the extent that housing 282 of apparatus 280 has in both left and right hand half-shells a forwardly extending bulge, or protrusion, or head, indicated generally as 284, that defines an internal chamber or accommodation 286. Accommodation 286 provides a seat for a motor 288. Motor 288 may be a brushless DC servo-motor. The axis of rotation of the output shaft of motor 288 is aligned with the axis of rotation of electrode rod 24. The output shaft of motor 288 is connected to the chuck (i.e., mounting 262, and jaws 266, 268) that hold rod 24 by a loose-splined fitting or coupling 290. Coupling 290 tolerates relative axial displacement of rod 24 as spring 62 vibrates. Motor 288, when in operation, may turn at a relatively slow speed. The speed of the output shaft of motor 288 driving the chuck may have a chuck speed in the range of 40-120 rpm, and may in one embodiment have a speed of about 60 rpm. Motor 288 need not be activated, and may be programmed for a single output speed, a choice of output speeds, or a continuously variable output speed such as may be controlled by the operator's inputs.

In the examples of apparatus 20 and apparatus 220, there may be an implicit assumption that the workpiece is moving, such that it has (at least) a single degree-of-freedom of motion, e.g., rotational spinning about an axis as indicated by arrow 'A' in FIG. 1. In addition there is at least a second degree-of-freedom of relative motion between electrode rod 24 and workpiece 30 by virtue of the vibration of rod 24 driven by the mechanical forcing function oscillator, (i.e., driven eccentric weight 136 input to spring 62, for example).

It may be that the workpiece to be coated or treated is not a welding cap spun about the axis of the body of revolution. The workpiece may not be a body of revolution. It may be that the workpiece is stationary, or, alternatively, that the workpiece is constrained to other degrees of freedom of motion, such as motion in an x-y plane, which may be linear motion along an axis in that x-y plane. That motion may be periodic and may be reciprocating. In the example of apparatus 280, quite aside from the manner in which the user manipulates the handle, the handle apparatus has both first and second degrees of freedom of driven motion in terms a driven function in reciprocating axial translation due to vibration, and a second degree-of-freedom of driven motion in rotation about the axis of rod 24. In this embodiment, whether the workpiece is stationary or not, the (at least) two-degrees-of-freedom of relative motion is provided by apparatus 280 in any event. Further, whatever orientation may be used by the operator, it is thought that rotation of rod 24, even relatively slow rotation, about its axis, may tend to promote more even consumption of rod 24 as a function of circumferential angular orientation of rod 24. That is, as rod 24 rotates it may tend continually to present "fresh" rod material to contact the work piece, and may tend to be consumed evenly.

ESD Surface Modifications

Figure 17A:
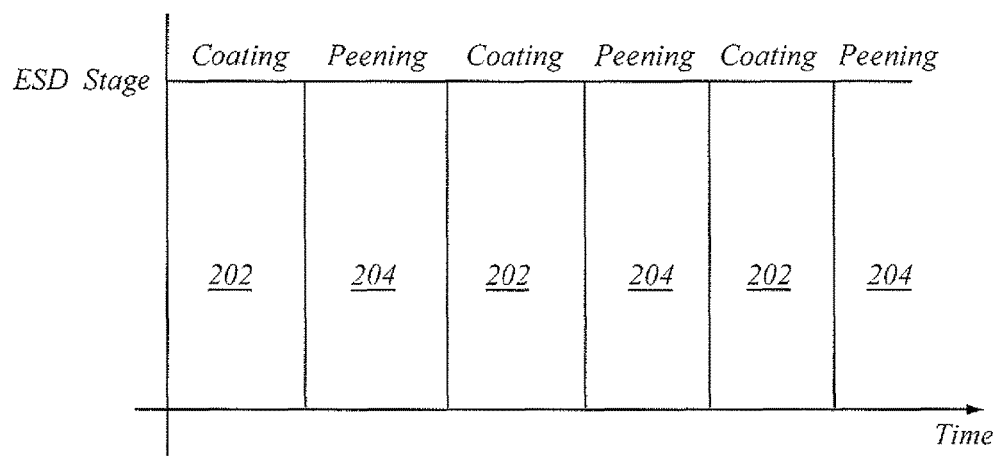
FIG. 17a is a schematic representation of alternating coating and peening stages as might be applied with the power source of FIG. 16.
Figure 18A:
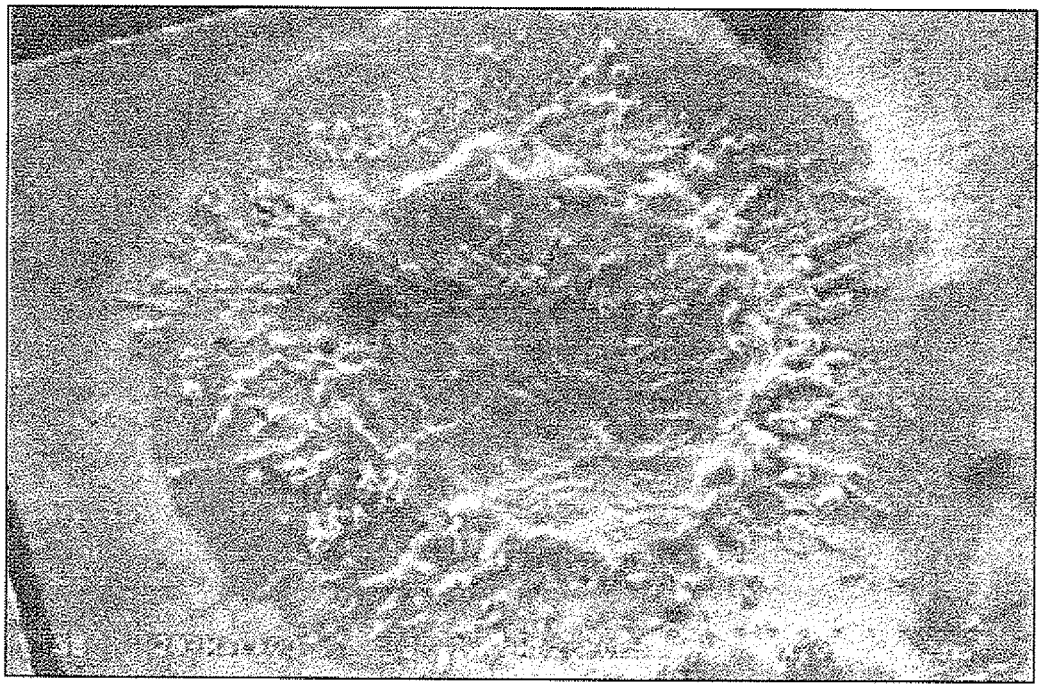
FIG. 18a is a much enlarged photograph of a "splash" of ESD coating material.
Figure 18B:
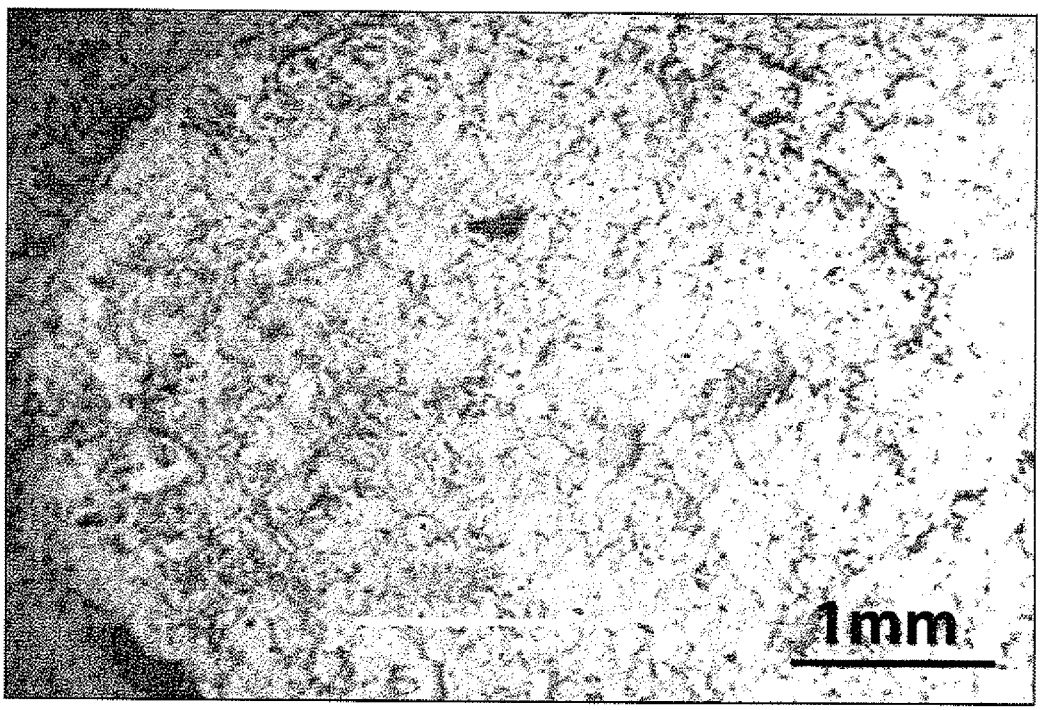
FIG. 18b shows an enlarged view of as-coated ESD workpiece surface.
Figure 18C:
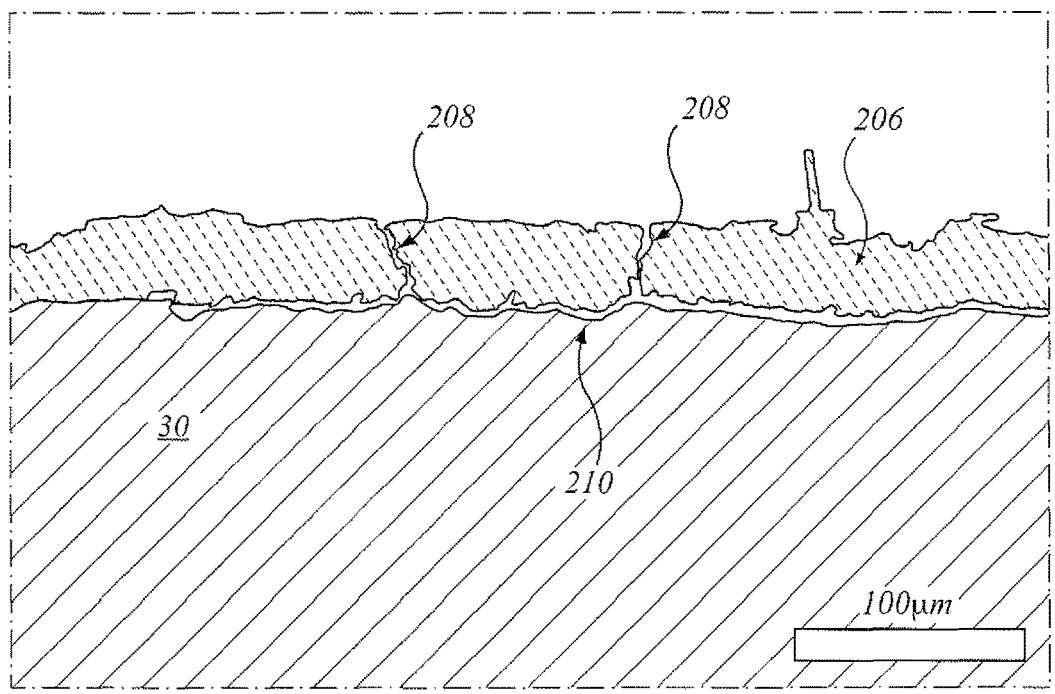
FIG. 18c is an enlarged cross-sectional view of an ESD coating sample on a workpiece.

As noted above, crack formation and delamination are known phenomena in electrode coating processes (See FIGS. 18b and 18c). There are different approaches to treating the ESD coating to reduce or to attempt to eliminate defects such as may be found in the coating. However, ESD coatings treated by post-processing may require expensive tooling and procedures. In an alternate approach described herein, an in-process ESD coating treatment action may occur during the coating process, substantially simultaneously. In this process the ESD power source 200 has an output that alternates between an ESD phase, or step, or duty-cycle portion, or period; and a peening power during the surface coating process as suggested by the alternating coating and peening stages 202, 204 in FIG. 17a.

It has been observed by the inventors that peening the surface coating 206 using the same vibrating applicator may cause plastic deformation of the coating, and, in so doing, may tend to close up the gaps or cracks 208 and reduce the number of delaminations 210 in the coating. That is, when the electrical power provided is reduced, as by reducing the voltage to a second voltage, $V_2$, below the voltage at which arcing can initiate, defined as the ESD initiation voltage, or first voltage, $V_1$, the melting of the approaching rod may tend not to occur. Instead, in the period of time in which contact is broken between the electrode rod and the workpiece no electrical current flows. Thus both rod 24 and the previously deposited material cool rapidly. However, while the temperature may still be high, it may not be high enough for the coating material to remain molten. Although below the melting point of the deposition material, and no longer molten, the coating may still be at a temperature at which the coating is soft and plastic, i.e., not fully hardened. At this elevated temperature striking the coating may tend to cause plastic deformation of the coating, which may tend to force closed cracks in the surface, such as cracks 208. It may be more effective to modify the surface, defects in the coating when the temperature of the coating is high, but not high enough to be molten.

As suggested in FIGS. 16, and 17a-17d, the ESD power source has a controller indicated generally as 212 that is capable of operation at two (or more) different levels of output power or voltage, or in (at least) two different modes of operation. There may be a first mode of operation, which may be termed an ESD coating mode corresponding to stage 202, in which the voltage differential V between the electrode rod and the electrode workpiece to be coated may be established at a first level, or first magnitude, which may be a voltage sufficient to cause arcing between the rod and the workpiece when they are brought into proximity with each other, and are then in contact. This is a deposition mode in which the coating materials melts and "splashes" onto the workpiece (See FIG. 18a). The deposition mode starts at a time $x_1$ at the ESD initiation voltage, although that voltage may drop rapidly as deposition occurs. The physical motion of the moving rod, e.g., due to an imposed mechanical vibration forcing function such as oscillation of handle apparatus 20, may then break the contact, ceasing the current flow, and ceasing deposition at time $x_2$ the time interval of deposition then being $x_1-x_2=t_1$.

Power supply 200 may then sense the cessation of current flow, and, given that sharp and sudden interruption in current, may drop the magnitude of the output voltage to electrode rod 24. This may be done by switching off the switch T1 that is connected to a first or main capacitor (or capacitor bank), C1, that is typically charged (and re-charged, as may be) to the ESD initiation voltage by ESD Power Control 214 typically by switching the controlling switch or transmitter $T_1$ to the "off condition", and by switching to another branch of the circuit having a capacitor (or capacitor bank) C2 whose initial charge is at a second, lesser selected voltage $V_2$ typically by switching the controlling switch on transmitter $T_2$ to the "on condition" Voltage $V_2$. charged and recharged across capacitor bank C2 by a Peening Power Control 216. Contact remains open over time period $t_2$. When the rod again approaches the work-piece and makes contact as at time $x_3$, the peening voltage is applied and current flows until contact breaks.

During the discharge phase, the power supply to the first capacitor bank is interrupted, i.e., shut off, so that the power supply does not supply power to C1 during discharge. Only once T1 has been opened (i.e, turned off), after the discharge phase of C1, is power reconnected to charge C1. Similarly, switch T1 does close (i.e., turn on or activated) until C1 has been charged to the programmed voltage threshold, (in this example, the ESD spark initiation voltage). Thus only once the capacitor bank has been fully charged is the apparatus enabled to discharge by turning "On" switch T1, at which time further charging current from the power supply is also inhibited. Thus the logic for switch T1 to be turned on requires that two conditions be met: first, that C1 has been charged to V1; and, second, that the time period counted out by the clock between the most recent previous step has expired. When switch T1 is activated to the "On" condition, the next time that the tip of rod 24 approaches the workpiece, discharge will ensue.

Similarly, the second capacitor or capacitor bank, C2, cannot be discharged unless it has been fully charged to its programmed or preset threshold voltage, V2. Switch T2 is only activated to the "On" condition when C2 is fully charged, and the pre-set timing gap between the most recent current flow has expired.

It follows that T1 and T2 are not "On" at the same time, although they may both be "Off" during the timing intervals between a T1 or T2 current flow cessation and the next succeeding T2 or T1 current flow commencement. While, in general, the time duration of each successive T2 or T1 "On" condition may be individually varied, they may typically be the same. Similarly, while the duration of the gap period (where neither T1 nor T2 is "On", but rather, both are "Off") may be individually varied it is convenient that they be uniform. Further, while the "On" and "Off" periods may differ, they may typically be of about the same duration, that duration being typically of the order of 1 mS-5 mS, and, in one embodiment, about 2 or 3 mS. The gap period may be very short, particularly where more than two capacitor banks are employed.

In one embodiment the second or lesser electrode voltage may be cut to zero. In another embodiment the magnitude of the second output voltage $V_2$ may be different from, such as being cut below, the ESD initiation voltage $V_1$, to a non-zero level at which current may flow on contact, and so a heating or warming effect may take place, but not so much heating as to cause melting. The warming may prolong the time during which the coating remains suitably soft for plastic deformation. In this second mode the voltage differential between the power supply output to the rod and the work-piece connection to the power supply may be commenced at, and continue at, a level that is less than, and may be substantially less than, of the ESD initiation voltage at commencement of discharge. In some embodiments it may be less than ½ of the ESD initiation voltage. For example, in some embodiments the first voltage may be in the range of 25 to 50 V DC and may in one embodiment be approximately 30 V. The second voltage may then be chosen to be a value of less than 30V, such as 0-30 V, and in one embodiment may be about 20V (or roughly, up to about ¼ of the first ESD initiation voltage, and in one embodiment about ⅔ of that initial voltage). In the first discharge circuit, there stored charge on the capacitor C1 is connected directly to the terminal, i.e., there is no intermediate current-limiting resistive element. Once arcing occurs, the discharge may have the form of a very rapid spike in which voltage drops rapidly. In the process, ESD Power Control supply 214 This lesser voltage may also decay somewhat over the contact time of the rod with the workpiece with the use of a resistor R1 mounted in series with the thyristor, or switch, T2. Thus there is a first mode at a first voltage or first power, and a second mode at a second, lesser, voltage or lesser power. In one embodiment the operator may set the selected first and second voltage levels $V_1$ and $V_2$.

Contact may again be broken when further motion of the welding rod occurs, as due to the mechanical vibration forcing function of the handle. Again, the power supply may sense the abrupt cessation of current flow, and may use that step change signal again as a signal, or datum, or indexing feature, or trigger, or triggering event to alter the voltage supplied. For example, in response to that triggering event, C2 power supply may switch off the second capacitor or capacitor bank C2 by switching off switch T2, (such that C2 may revert to a charging or recharging mode powered by Peening Power Control 216); and may revert to the first capacitor C1, such that a new deposition period or step or stage, or duty cycle, may commence.

Alternatively, power supply 200 may switch to a third capacitor, or capacitor bank which may be at either the same initial voltage as C1 (in the event that C1 is still recharging and a fresh, fully charged ESD initiation voltage charge is required); or the same voltage as the initial voltage of C2 (in the event that a fresh lesser voltage charge is desired); or a third voltage, that is different from either of them. For example, the initial voltage of C2 (or a cut-off condition of no voltage to the electrode holder, whether there is a sec/ond bank of capacitors or not), may be zero. Alternatively that second voltage, or power level, may be quite low because the newly deposited coating material remain very hot, and needs little or no additional heat when the rod approaches to contact it for a second time. It may be that by the third period of contact, the deposited material may be somewhat cooler than it was during the second contact period, and so it may be that more heating than previously is desirable to slow cooling such that the surface coating may remain plastic, or more easily made plastic. Thus the third voltage may be higher than the second voltage, and yet still well below the level of voltage and power such as might cause the coating again to become molten. The schedule of first, second, and third voltages may be pre-programmed into the power source controller, or the voltages may be selected by the user.

After being contacted for a third time, contact may be broken again due to the motion forcing function of the electrode holder. Once again, the sensors of the power supply, monitoring current, for example, may indicate a step change in current (i.e., a drop to zero) when contact is broken, and voltage may be switched "off" or "on", accordingly in respect of the next branch of the circuit. There may be several low voltage or zero voltage impacts of the rod with the work piece. However many "cold" impacts there may be, be it one or more than one, after a period of time the process may start back at the beginning with C1 and a higher voltage, namely the ESD spark initiation voltage, such as to cause additional new coating material from the electrode rod to be deposited on the work piece.

In the process described above, the power supply may tend continuously to be sensing and evaluating current flow as a means to trigger switching or altering of voltage levels supplied to electrode rod 24. In an alternative to the process described above, the speed of rotation of the workpiece may be known, and the frequency of vibration of the motion forcing function of the vibrating handle may also be known, such that the period of time between successive contacts, and breaks of contact, between the electrode rod and the workpiece is known, at least in an approximate sense. With the frequency of vibration being known, the power supply may be programmed to run at the first voltage for a given period of time, that period of time being at least as great as one wavelength of the forcing frequency. That is, if the forcing frequency is 100 Hz, then the time of C1 voltage "on" would be at least 10 ms. That period may then be followed by a period of time at least as long as one wavelength of the forcing frequency in which the C2 voltage is applied. In the event that there is a third voltage, the power supply may follow the second period of time by a third period of time of at least one wavelength at the third capacitor bank voltage, and so on, for as many time periods and voltage variations as may be.

In the embodiments described, the nature of the deposition step is different from the nature of the non-deposition step. In the deposition step, the action is, substantially, a discharge of accumulated charge against a very low, or approximately zero, resistance. The essence of the step is a capacitive discharge. It may be characterized as a spike that commences at V1, and in which the current is very large, but of short duration at a rapidly falling voltage level. By contrast, the presence of resister R1 in the second circuit, namely the circuit of switch T2, may tend to be current limiting. R1 may have a resistive value in the range of ½ or 3 Ohms. The current flow in that second stage or phase or portion does not then approximate a sudden surge or spike of an unrestricted capacitive discharge, but rather a portion, perhaps an initial portion, of a controlled capacitive decay curve with an RC time constant, that constant being a function of the product of R1×C2. That decay curve commences at V2. Where the time period of contact is very short, the end voltage may be relatively close to V2. While there may be an initial very short period of a spark during the T2 "On" phase or stage, given the voltage drop across R1 the phenomenon is one of high current flow heating the coating during contact, as opposed to an arcing phenomenon.

In the process, the welding electrode cap to be coated may be spinning or turning at some rotational speed. That speed of rotation of the workpiece may be of the order of as low as about 200 rpm, and may be as high as 1200-1800 rpm. In one embodiment it may be about 300 rpm to about 600 rpm. It may be driven by a motor running at 1725 rpm through a reduction drive. The BLDC motor of the oscillator drive in the vibrating handle may run at speeds in the range 15,000-20,000 rpm, and in one embodiment may be about 18,000 rpm, or 300 Hz. The mean contact time of the rod with the electrode cap such as $t_1$, $t_3$, $t_5$, etc., may be in the range of 1-10 mS, and in one embodiment may be about 3 mS. In general $t_1=t_2=t_3=t_4=t_5=t_6$, although this need not be so. That is, the mean contact time need not be equal to the mean dis-engagement time. The contact time while melting and depositing material may vary from the contact time while peening the coating.

The hammering or repeated mechanical impact process that occurs while the voltage is reduced (or cut to zero), may be termed "peening" of the coating, and may be associated with a lower, peening power level. Normal ESD electro-spark depositions are formed during the coating cycles (or periods). The peening actions used to modify the surface coating layer are introduced during the peening periods or reduced power. As described above, the output of the ESD power source is switched to a different power level, which could be zero voltage, during the Peening cycles (periods). The already-deposited surface is modified by the peening actions. That is, while the coating material is still warm, immediately after deposition, the vibrating action of the electrode rod, driven by the vibrating handle, contacts the deposited surface, tending to make it an impact surface. As the name may suggest, the surface is thought to undergo a "peening" or hammering during the repeated impacts. Plastic deformation of the cooling, formerly molten and temporarily deformable surface may tend to reduce, or close up, cracks and may discourage delamination that may have occurred during, or to have arisen from the ESD coating actions. While peening may occur with no electrical current to the electrode rod, the use of some continuing current as a peening power level may tend to maintain the temperature of the spot under the peening actions and thereby slow the cooling process, such as may tend to allow a longer time period in which the coating may be locally plastically deformed. The peening power electrical voltage and current levels may be adjusted depending on the coating subjects and applications.

The power source, or power supply described above may be used to implement the in-process coating and peening actions during the coating process. That is, the dual action ESD power source is able to deliver the voltage or power for the regular ESD actions, and also to deliver power (electrical power could be zero) for the peening actions.

The Dual Action ESD power source or power supply 200 includes the following modules:
ESD Power Control 214: for the voltage control of the ESD capacitor, C1.
Peening Power Control 216: for the voltage control of the Peening capacitor, C2.
Dual Action Control Unit 218: for the voltage control of the ESD and Peening capacitors; also the switching control of the ESD and Peening power outputs.
User Panel 215: for the programming of the ESD and Peening capacitor voltages; and the control pattern of the ESD and Peening actions.

The ESD and peeing output pattern is programmable by setting some parameters via user panel 215. This may permit flexibility for the control of output patterns in different application environments.

The length and frequency of the coating and peening periods are adjustable, and may depend on the target coating subjects and materials. There power level may also be adjusted according to variations in the nature of the coating and peening action and these parameters are dependent on the target subjects and materials.

Surface coating modification methods may employ ultrasonic pressurized rotating friction process. This method may be used to encourage improvement of the density of the coating layer material and the bonding of the coating material to the base metal of the substrate. This process may be applied in respect of the coating of welding electrodes. Coating electrodes, or other surfaces.

Material of FIGS. 18d-18h, 21, 22, 23 and 24

FIGS. 21, 22, 23 and 24 show details of an apparatus for the modification of surface coatings on resistance welding electrodes. That is, in the example the workpiece may be a welding electrode cap. The cap may have a coating. The coating may be a TiC coating. The workstation for the clamping and rotation of the workpiece may include a work bench A; an equipment frame 302; an electric motor 303; a transmission belt 304; a pulley 305; a supporting bearing 306; a transmission shaft 307; a clamping chuck 308 for holding the workpiece, and guiding rails 309 and 310. Components of an integrated ultrasonic rotating friction head assembly may include sliders 311; a lower panel 312; a screw shaft 313; an upper panel 314; an ultrasonic positive power terminal or input 315; an ultrasonic negative power terminal or input 316; a bushing or brush or sliding conductor 317; bearings 318; a belt pulley 319; a transmission or drive belt 320; an electric motor 321; an ultrasonic transducer 322; a transducer horn 323; a rotating friction head 324; a housing 325 and a slider 326. Components of the ultrasonic power source may include an ultrasonic power source positive terminal or output 327; an ultrasonic power source control knob 328; an ultrasonic power source positive output 329, and an ultrasonic power source power switch 330.

The following is a description of an apparatus and method for post deposition treatment of a coated resistance welding electrode, as shown in FIGS. 21, 22, 23 and 24.

A work table A is employed for the clamping of the workpieces. Table A may have an equipment base or frame 203, an electric motor 303, a mechanical transmission or drive belt 304, a pulley 305, a supporting bearing 306, a transmission shaft 307, a clamping chuck, or tool-holder, in which to hold the workpiece 308, a first track or guide rail 309 and a second track or guide rail 310.

The integrated ultrasonic rotating friction head assembly B (which may in essence be apparatus 20, 120, etc.) may have a slider 311, a lower panel 312, a screw shaft 313, an upper panel 314, an ultrasonic transducer positive input terminal 315, an ultrasonic transducer negative input terminal 316, a brush or shoe, or sliding conductor 317, bearings 318, a belt pulley 319, a mechanical transmission or drive belt 320, an electric motor 321, a transducer 322, a transducer horn 323, a rotating friction head 324, a housing 325 and a slider 326.

An ultrasonic power supply C may include an ultrasonic output positive terminal 327, an ultrasonic output power knob 328, an ultrasonic output negative terminal 329, and an ultrasonic power switch 330.

The apparatus may include the integration of the combined apparatus of assemblies A, B and C. Electric motor 303 of the workstation A is fixed to, or mounted to, the main machine frame 302. Drive power from the output shaft of electric motor 303 is coupled to drive transmission shaft 307 in rotation through the transmission belt 304, pulley 305 and supporting bearings 306.

The workpiece having a surface coating to be treated or modified is mounted to, or in, clamping chuck 308. Clamping chuck 308 is connected to the transmission shaft 307, such that operation of motor 303 may cause corresponding driven rotation of chuck 308. Guide rails 309 and 310 of module A are fitted to, or mated to, or engaged with, sliders 311 and 326 respectively of the integrated ultrasonic rotating friction head assembly B.

Pressurized rotating friction motion from rotating friction head assembly B can be repeatedly applied to the surface coating on the workpiece 301 as required for the processing procedure. In this description the term "pressurized" may tend to mean pressing or forcing, or biasing, the coating apparatus against workpiece 301 under some biasing force, where at least a component of the force is normal to the surface of workpiece 301 at the location of contact of the coating interface, such that the coating apparatus is biased against the workpiece such that relative motion (e.g., including a component of motion tangential to the normal vector defining the line of contact of the surfaces) between them will give rise to friction between the coating apparatus and the workpiece surface, e.g., in the tangential plane to which the normal vector of the surface is perpendicular.

Upper panel 314, which is mounted with the rotating friction head assembly, is connected to lower panel 312 through the coupling of screw rail 313. Rotating friction module B can be driven up and down with the use of the screw shaft of screw rail 313. Application of certain pressure, or force, of, or against, the coating surface of workpiece A can also be achieved with simultaneous rotational motion, be it of workpiece A or of the coating apparatus. The positive 315 and negative 316 terminals of the ultrasonic transducer are connected to the output positive 327 and negative 329 terminals, respectively, of ultrasonic power supply C. Sliding conductor 317 is connected to transducer 322 with the use of a pair of electrical wires. Transducer 322 is connected to the transmission horn 323 for the transmission of ultrasonic energy to rotating friction head 324.

The shape of the top of the friction head could be flat or curved according to the requirement of the workpiece. Ultrasonic pressurized rotating friction, i.e., friction at the contact interface of the rotating surface under a biasing force normal to that surface, can be applied onto the coating surface of workpiece 301 with the use of the integrated friction head assembly. The rotation is driven through electric motor 321, driving belt 320, belt pulley 319 and bearings 318.

In this application example, on workstation A, the transmission shaft that is mounted with a clamping chuck is driven in rotation by the electric motor through the coupling of transmission belt, pulley and bearings. The integrated ultrasonic rotating friction head assembly can be moved vertically through the fitting of the two sliders on the lower panel with the two guiding rails on workstation A. The rotating friction process can be applied to the workpiece repeatedly.

In this embodiment, the ultrasonic rotating friction head assembly is attached to upper panel 314 which is connected to lower panel 312 through screw shaft 313. The screw shaft serves two purposes, namely, first, to move the ultrasonic rotating friction head assembly vertically (up and down); and, second, to apply pressure, or a biasing force, to workpiece A.

The ultrasonic rotating friction head assembly is driven in rotation by the electric motor through the coupling of the belt and bearings, such that the workpiece rotates. It is also driven to make contact and apply pressure, that is a biasing force, to the workpiece through the control of the screw shaft. With the application of ultrasonic vibration, the apparatus is able to perform ultrasonic pressurized rotating friction processing to the surface coating of the resistance welding electrodes. That is, while the apparatus is under the biasing force against workpiece A, and while there is rotating friction, ultrasonic vibration is also being applied and transmitted across the same contact interface.

The following gives the procedure of the ultrasonic pressurized, or force-biased, rotating friction process:

1) The welding electrode is mounted to the clamping chuck properly.
2) Turn on the power to the workstation, ultrasonic power source and the rotating friction head assembly.
3) Adjust for proper pressure, i.e., biasing force, workpiece rotational speed, rotating friction head speed, and ultrasonic power level.

The rotating friction head, with external pressure (i.e., biasing force) and ultrasonic vibration is then used to treat or modify the surface coating of the welding electrode, or to such other coated surface as may be. The rotating friction head is moved, or translated, or reciprocated, along guide rails 309, 310 to cover the complete surface of the coating on the welding electrode. The power is turned off when the process is finished.

In this example application, the ultrasonic power may be about, or is 100 W; ultrasonic frequency may be about, or is 50 kHz; pressure (i.e., biasing force) on the surface coating from the rotating friction head may be about, or is, 200 N; rotational speed of the rotating friction head may be about, or is 1400 rpm. For a welding electrode cap the process time may be about, or is, 3 minutes.

Figure 18G:
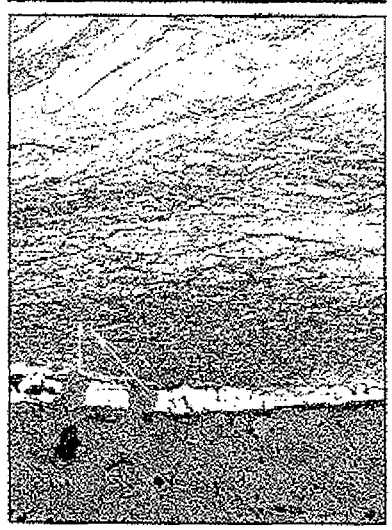
FIG. 18g is a photographic view showing a comparison in cross-section of ESD coating SEM views of effects of the ultrasonic pressurized rotating friction processing, FIG. 18g being a before the process view.
Figure 18H:
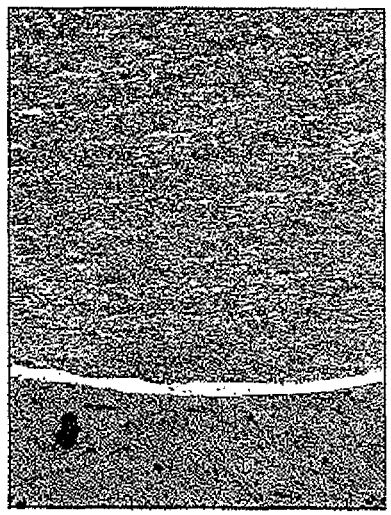
FIG. 18h is a photographic view showing a comparison in cross-section of ESD coating SEM views of effects of the ultrasonic pressurized rotating friction processing, FIG. 18h being an after the process view.

FIGS. 18g and 18h show the change in the electro-spark deposition surface coating of a sample after modification according to the ultrasonic pressurized rotating friction process using this setup of apparatus as described above.

In the example described, the microscopic views show an improvement in respect of the coating defects. That is, the delaminations, cracks, discontinuities and voids are significantly reduced, or eliminated, with the application of the process described. It is also noted that the grain of copper alloy near the coating boundary zone has also been refined, i.e., made finer, after the process.

To summarise, the above example discloses a method and apparatus for the processing of a surface coating. It includes an ultrasonic pressurized, or force-biased, rotating friction head assembly that is used to apply the surface coating of the workpieces. The shape of the friction head could either be flat or curved depending on the surface of the coating on the workpiece. In this process, rotating action (i.e., rotation of the workpiece, or, more generally, relative motion between the workpiece and the coating apparatus to which the normal vector of contact is perpendicular) in conjunction with ultrasonic vibration while the applicator is force-biased against the workpiece, is used to apply the surface coating on the workpiece, and to improve the properties of the surface coating. In the particular application, the apparatus used for the ultrasonic pressurized rotating friction coating processing may have a work station in which to mount and in which to rotate a TiC coated welding electrode as the workpiece. There is an integrated rotating friction head assembly completed with an ultrasonic transducer; and an ultrasonic power source. The process includes the integration of a force-biased rotating friction device with an ultrasonic transducer. The integrated device, with the concurrent application of rotating friction and ultrasonic vibration, may tend to reduce the defects that might otherwise occur on the TiC coatings on welding electrodes produced using the electro-spark deposition process.

The process described, with the application of ultrasonic rotating friction under a normal force, may tend to improve the binding strength of the ESD coating layers and also may tend to reduce or eliminate coating defects. It may improve the physical and mechanical properties of the coating while preserving the material contents intact. The apparatus and process of the example described may have advantages of reduced cost and increased ease of use. In addition to treating electrospark deposition coating defects, this invention may also have other applications, such as being employed to repair other surface coatings covering a wide range of applications. This description is intended to apply to such other coating applications as may be amenable to the application of the ultrasonic pressurized (or force-biased) rotating friction process.

Thus, in the forgoing, a welding electrode is mounted in a tool holder that is part of a handle apparatus. The handle apparatus has an electrode power connection. The handle apparatus has a housing defining a haft that can be grasped in the hand of an operator. A vibrator is mounted inside the haft. The vibrator includes a force transmitter in the form of a cantilevered beam. The cantilevered beam is electrically conductive and carries power to the tool holder. The tool holder has a handle that penults the welding rod to be rotated about its axis as it wears during deposition of welding rod material on the object work piece. The handle has a power supply that may vary voltage level to permit deposition cycles and peening cycles.

Description Pertaining to FIGS. 25 to 29

In the various Figures the annotations identify the following features:

A Electro-spark deposition ESD power source;
Vibrating ESD coating applicator;
C Integrated transducer assembly I and workbench drive assembly II;
D Ultrasonic Generator;
401 ESD power source positive terminal;
402 ESD power source negative terminal;
403 Resilient conductor spring;
404 Discharge electrode mounting;
405 Discharge electrode;
406 Eccentric wheel;
407 Handle;
408 Bakelite insulator;
409 Flexible shaft;
410 Low power applicator motor;
411 Workpiece;
412 Work bench negative terminal;
413 Integrated transducer negative terminal;
414 Integrated transducer positive terminal;
419 Integrated transducer body;
420 Transducer horn;
15, 421 Ultrasonic transducer;
422 Flat pulley;
423 Ball bearing;
424 Jaw chuck;
425 Drill chuck;
II Drive assembly;
415 Work bench drive motor;
416 V-belt;
417 Ultrasonic power output negative terminal;
418 Ultrasonic power output positive terminal The aspects of the invention to which FIGS. 18g, 18h, 25, 26, 27a, 27b, 28 and 29 pertain may tend to provide a rotary electro-spark deposition surface coating process and apparatus, such as may be intended to improve electrode coating quality, tending to aid in increasing electrode life. This invention is particularly suitable to the application of electro-spark deposition coating of resistance spot welding electrodes.

In an embodiment herein, a rotary electro-spark deposition surface coating process includes: mounting a workpiece on to a rotating base or fitting table. The surface of the workpiece is coated using an electro-spark deposition (ESD) process. Ultrasonic vibration is applied to the deposition layer during its crystallization phase. The crystallization phase of the deposition coating is completed while ultrasonic vibration continues to be applied to the workpiece. The process is a rotary electro-spark deposition surface coating process. In this process the workpiece as described may be a resistance spot welding electrode.

In one embodiment, the rotary electro-spark deposition surface coating apparatus may include: a vibrating ESD coating applicator, an electro-spark deposition power source; an integrated transducer assembly; a drive or transmission at, or of, a table, or bench or work-station for driving, e.g., rotating, the workpiece relative to the coating applicator; and an ultrasonic vibration generator. The sonic vibration transducer may be mounted to co-operate with the work bench drive. The workpiece is mounted to the integrated transducer and motive drive assembly. In the process, the rotary electro-spark deposition surface coating apparatus may coat or treat workpieces that may be resistance spot welding electrodes.

The rotary electro-spark deposition surface coating apparatus may further include an electro-spark deposition power source A. Power source A may include an ESD power source positive terminal, 401, and an ESD power source negative terminal, 402.

Vibrating applicator B (in essence, apparatus 20, 120, etc.) may include a spring conductor 3, a discharge electrode mounting screw 404, a consumable welding rod of coating material, such as may be indicated as a discharge electrode 405, an eccentric wheel 406, a handle, or rod holder, or arm 407, a bakelite insulator 408, a flexible shaft 409 and a low power applicator motor 410.

In use integrated transducer assembly I may show, or have, the following features, namely a workpiece to be coated 411, work bench or workstation negative terminal 412, an integrated transducer negative terminal 413, an integrated transducer positive terminal 414, an integrated transducer body 419, a transducer horn 420, an ultrasonic transducer 421, a flat pulley 422, a ball bearing 423, a jaw chuck 424 and drill chuck 425.

Workbench drive assembly II may include, or have, a work bench or workstation drive motor 415, and V-belt 416.

Ultrasonic generator D may have or include an ultrasonic power output negative terminal 417, and ultrasonic power output positive terminal 418.

ESD power positive terminal 401 may be connected to a resilient member identified as a conductor spring 403. ESD power negative terminal 402 is connected to workbench negative terminal 412. Discharge electrode 405 is mounted to the spring bar, namely conductor spring 403 by tightening a discharge electrode mounting screw 404. Applicator handle 407 is connected to the low power motor 410 through a connection of, or with, flexible shaft 409. Eccentric wheel 406 is driven in rotation by the driving of the low power motor 410 through the connection of flexible shaft 409 and handle 407 for, or during, the vibrating coating deposition process.

Ultrasonic power output negative terminal 417 is connected to integrated transducer negative terminal 413. Ultrasonic power output positive terminal 418 is connected to integrated transducer negative terminal 414. Integrated ultrasonic transducer assembly I is driven in rotation by drive motor 415 by the use of flat pulley 422 and V-belt 416. Ultrasonic vibration transducer 421 is connected to the integrated transducer negative terminal 413 and integrated transducer positive terminal 414, respectively. Transducer horn 420 and ultrasonic transducer 421 combine to act on the shaft of the rotary work platform. A tool holder, or seat, or mandrel, or center, or jig, in the form of a drill chuck 425, is mounted to the rotary work platform by means of being clamped in the jaws of a rotatable driven chuck 424. Workpiece 411 is mounted to drill chuck 425 during the rotary ultrasonic-assisted ESD process.

The vibrating applicator described above may act as the positive terminal of the ESD process. It is connected to positive terminal, 401, of the ESD power supply. The discharge electrode 405 (i.e., the welding rod composed of the coating material to be deposited on the workpiece) is mounted to conductor spring 403 by tightening discharge electrode mounting screw 404. Negative terminal 402 of the ESD power source, or power supply, A, is connected the negative terminal 412 of the work bench or work station. Vibrating ESD deposition is carried out during simultaneous operation of the low power motor 410, flexible shaft 409, handle 408 and eccentric wheel 406.

The ultrasonic generator output positive terminal 418, and ultrasonic output negative terminal 417 are connected to the respective positive and negative terminals 414 and 413 of the work bench respectively.

Transducer horn 420 is connected to the ultrasonic transducer 421 by a shaft. Transducer horn 420 then drives the jaw chuck 424 and the tool holder, namely drill chuck 425 of the work bench rotation through the couplings of the rotating shaft. The ultrasonic transducer is contained inside a transducer casing or housing. The transducer casing is built of insulating materials. Jaw chuck 424 is mounted to the driven output rotating shaft using a dedicated screw. Drill chuck 425 is then mounted to, or connected to, jaw chuck 424. The workpiece, in this embodiment resistance spot welding electrode 411, which is secured to or in drill chuck 425, is driven in rotation and the coating material is applied according to the ultrasonic assisted electro-spark deposition process. The rotating shaft drive driven by motor 415 and the vibrating drive provided by ultrasonic transducer 421 are thus, combined in an integrated unit.

This description describes, inter alia, an apparatus such as may be used to apply ESD coatings to work piece surfaces to modify the properties of those surfaces. The work piece may be moving, e.g., rotating during the process. That apparatus may be used according to an ESD coating application procedure that may include the steps of:

1. Choosing a type of discharge electrode prepared with the proper composition of materials for the desired ESD coating to be applied; and mounting the discharge electrode to the vibrating applicator. A resistance spot welding electrode may be selected as the workpiece in this application example.

2. Turning on power to the apparatus, including power to the electro-spark deposition power source, power to the ultrasonic generator, power to the workbench motor drive and to the vibrating applicator. The process may include adjusting the associated operational parameters including the vibrating applicator frequency, motor drive speed and ultrasonic generator power. In the ultrasonic assisted electro-spark deposition process, contact between the discharge electrode and the workpiece should be made lightly, with a component of relative horizontal (e.g., tangential) modulation movement to cause a layer of coating to be deposited on the workpiece surface. The time duration of the process may depend on the thickness to be deposited and the type of coating material. The basic principle is that the coating be applied made evenly on the surface of the workpiece, and should cover the surface completely. No base metal of the workpiece contact surface should be left open or uncovered. Also, the time duration of the electro-spark deposition process should not be too long, to avoid softening and annealing of the copper alloy material of the workpiece.

3. Turning off the power to the workbench when the electro-spark deposition process is completed; and removing the coated electrode (workpiece) from the fixture assembly. This coating process may then be repeated with another uncoated workpiece, as may be.

4. Turning off power to all other devices if there is another coating process to implement.

The apparatus shown and described herein concerns use of ultrasonic-assisted ESD coating technology. It differs from traditional vibrating ESD coating processes. Comparison may be made with patent CN102019531A:

1. In the apparatus and method described herein, ultrasonic vibration is applied to the workpiece being coated in the electro-spark deposition process. Grain crystallization of the coating material takes place under the application of ultrasonic vibration. By contrast, patent CN102019531A specifies the application of ultrasonic vibration to the discharge electrode. The surface coating on the workpiece produced directly under the application of ultrasonic vibration is different from the ones produced by using the other approach. Having direct ultrasonic vibration applied to the workpiece is thought to be a new, useful, and unobvious feature of the apparatus and method shown and described herein. Having ultrasonic vibration applied to the workpiece during the grain crystallization of the coating material in the electro-spark deposition process is also understood to be a new, useful, and unobvious feature shown and described herein. These features are thought to tend to improve grain refinement of the coating material and adhesion between the coating and the metal matrix of the base substrate.

2. In the apparatus shown and described herein, ultrasonic vibration is applied to the workpiece being coated in the ESD process. Ultrasonic vibration in this case may improve or reduce the influence of the heat-affected zone (HAZ). Meanwhile the application of ultrasonic vibration to the discharge electrode as claimed in CN 10201931A appears to have no influence on the HAZ between the ESD layer and the substrate metal matrix.

The apparatus and method described herein may have relative simplicity of operation, may be relatively low in cost, may have high applicability, and may emit relatively little noise. In the embodiment or application example described herein, the ultrasonic power may be 70 W, ultrasonic frequency may be 50 kHz, the rotational speed of the workbench may be 700 rpm, the material of the discharge electrode may be TiC, the electro-spark deposition voltage may be 7V, and deposition time duration may be 2 minutes.

For comparison, samples were produced with the same parameters except that one set was treated with the application of ultrasonic vibration as described herein, while the other sample was treated without ultrasonic vibration. From this comparison test, it was found that the electro-spark deposition coating applied under ultrasonic vibration exhibited improvements over the ones in which the coating was applied without ultrasonic vibration: Higher coating hardness; reduction in coating defects; and better adhesion of the coating to the metal matrix substrate. Performing welding life tests, the working life of TiC electro-spark deposition coated under ultrasonic vibration welding electrodes was found to be 800 welds while the ones coated without ultrasonic vibration was 500 welds.

FIGS. 27*a* and 27*b* illustrate the microstructure of the coatings produced under the two different conditions. FIG. 27*b* shows that coating defects are reduced when the coating is deposited at the same time as ultrasonic vibration is applied to the workpiece. The size of the HAZ zone and its grain size is significantly less than that of the sample coated without the application of ultrasonic vibration as shown in FIG. 27a.

FIG. 28 charts micro-hardness of coating layers applied with and without ultrasonic vibration. It is observed that the micro-hardness of the coating applied with the use of ultrasonic vibration (small round dot line) is very even across, such that a HAZ region transition is not obvious. Meanwhile it is noted that there is a section of the micro-hardness line of the coating applied without the use of ultrasonic vibration (small square dot line) has a significant drop in hardness indicating the existence of the HAZ. It can be concluded that grain growth in the HAZ at the coating is significantly affected by the application of ultrasonic vibration. The dendrites which exist in the HAZ area are reduced, or broken off, when the coating is produced with the application of ultrasonic vibration on the workpiece. This may tend to avoid the formation of large grains and thus a significant HAZ.

Figure 29:
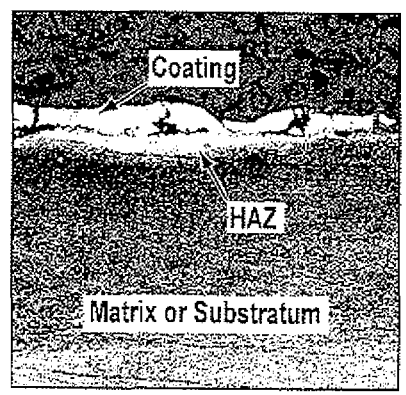
FIG. 29 is a metallurgical chart of a coating under patent CN 102019531A.

FIG. 29 shows the microstructure of the coating applied according to Patent CN 102019531, in which ultrasonic vibration is applied to the discharge electrode. In this case, ultrasonic power is 70 W, ultrasonic frequency is 50 kHz, rotational speed of the work station is 700 rpm, the material of the discharge electrode is TiC, the electro-spark deposition voltage is 7V, deposition time is 2 minutes. By comparing FIGS. 29 and 27a, the coating defects and the grain sizes of the HAZ when coating with ultrasonic vibration applied to the discharge electrode appears to yield no significant difference from the coating deposited without application of ultrasonic vibration. A welding electrode life test was performed. It found that the welding life of the electrode coated with the application of ultrasonic vibration to the discharge electrode to be 500 welds. This is the same as the working life of the welding electrode coated without ultrasonic vibration.

With the ultrasonic-assisted electro-spark deposition technology, this apparatus and method described herein may yield improved grain refinement of the coatings, and may tend to avoid or reduce the occurrence of a HAZ that might cause increased service problems. The apparatus and method may tend effectively to overcome, or ameliorate, the defects and difficult problems of coatings produced using conventional electro-spark deposition technology. In addition, the cost of the apparatus may be modest, and the apparatus may be relatively simple to operate. The apparatus and method described herein may have a wide spectrum of application. Other than the resistance welding electrodes, the apparatus and method may be applied to the ESD coating of other workpieces, such as rotating workpieces.

A surface modification process and apparatus for the electro-spark deposition (ESD) on a workpiece may include mounting a workpiece on a rotationally driven mounting. The contact surface of the workpiece is ESD coated. Ultrasonic vibration is applied to the deposition layer during its crystallization phase. The workpiece may be a resistance spot welding electrode. The apparatus may have a vibrating applicator, ESD power supply, integrated ultrasonic transducer assembly, a work station having a rotational drive and an ultrasonic generator. The ultrasonic generator is connected to the ultrasonic transducer. The ultrasonic transducer assembly and the rotating driving work bench unit are integrated in a single assembly. The workpiece seats on the ultrasonic transducer assembly. The deposition of a surface coating occurs during simultaneous application of electro-spark deposition and ultrasonic vibration.

As explained above, in this third portion of the description there is a method and apparatus for the processing of surface coating is disclosed concerning the design of an ultrasonic pressurized rotating friction head assembly used to apply a surface coating to a workpiece. The shape of the friction head may be flat or curved as appropriate for the workpiece. The surface coating is rotated under repeated contact and ultrasonic vibration. The apparatus includes: a work station for the mounting and rotation of a TiC coated welding electrode workpiece; a rotating friction head assembly with an ultrasonic transducer and power source. Concurrent application of pressurized rotating friction and ultrasonic vibration, may tend to reduce the defects in the TiC coatings on welding electrodes produced using the electro-spark deposition process. While maintaining the basic coating material component contents, mechanical and physical properties unaltered, defects such as delaminations, cracks, discontinuities and voids may be reduced. Control and operation of the may be adapted to other applications.

Figure 19:
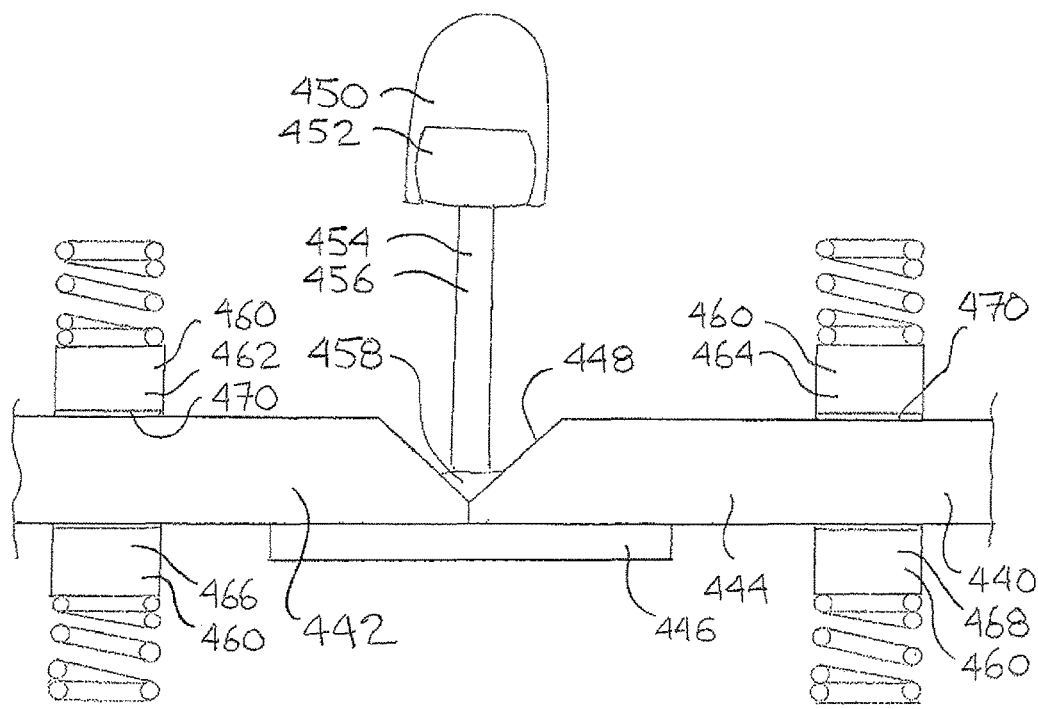
FIG. 19 is a cross-sectional view of a welding arrangement according to an aspect of the invention herein.

In FIG. 19 there is a welding arrangement. In that arrangement there is a workpiece 440, which may be a single workpiece, or may be two workpieces 442, 444 that are to be joined together. In some instances a backing bar 446 may be provided to prevent weld-through of work pieces 442, 446 at the penetration at, for example, a bevel weld 448. The depth of the bevel, and the depth of the abutting edges of items 442 and 444 below the bevel may depend on the expected depth of penetration of the weld.

Although the workpiece is shown in two parts in the context of welding the two parts together, workpiece 440 could be a single workpiece, and the bevel may be a slot, or groove or channel, or gouge. That is, in some embodiments, the process may be filling a gouge or damage of whatever cause where the gouge needs to be filled. In other embodiments, the accommodation in the surface may be a slot or groove that forms the root or base of a dissimilar material insert, such as may be desired to add a ceramic insert for a wear surface or cutting element, such as in a drill bit or in forestry equipment, or in mounting teeth or wear surfaces on mining or construction equipment, such as the teeth of loaders, buckets, and so on.

However it may be, a welding tool, or welding head, or welder, or welding electrode, is shown generally as 450. It may include an electrode holder 452 and may have mounted therein an electrode 454. The electrode may be a consumable electrode rod 456. Holder 452 may be a vibrating holder, and may be a vibrating holder as described hereinabove, such as items 20 and 120, or as may be. Holder 452 may be hand-held, or may be mounted to a welding head or frame or jig, or welding table, such as suggested by the arrangement of FIG. 20, for example. However it may be, holder 452 may be a vibrating holder, and may be provided with a power supply as described above such as may be operable at a first voltage, such as an initiation or striking voltage, and at a second, lesser voltage. That lesser voltage may be zero. Whatever the lesser voltage may be, during the cycles of vibration of holder 452 (and therefore of rod 456) in which the lesser voltage is applied, the electrode may agitate the deposited material 458, and where that material has begun to solidify, to strike that material in the hitting, deforming, or peening manner discussed above.

Whatever the case may be, the workpiece is secured appropriately to the jig or table, or holder, or mounting, or fixture (however it may be termed) for the welding process, whether by clamping or other means. The workpiece may be secured to a movable bed. The movable bed may have a single degree of freedom of motion (as in being spun or rotated in a single angular degree of freedom; or as in linear translation in a translational degree of freedom); or it may have more than one degree of freedom of motion, whether those degrees of freedom include, for example, x and y translation, or also include an angular degree of freedom, alpha or theta. The motion may be reciprocating motion. The motion may also follow a particular path, such as a programmed path, such as may follow a line or contour or pattern (e.g., to follow a weld fillet, or the shape of a gouge or other damage, or a desired wear plate or insert, boundary, shape or pattern, as may be.

Alternatively, or additionally, or equivalently, the workpiece may be held on a stationary bed or fixture while holder 452 may be movable, or both the bed and holder 452 may have degrees of freedom of motion such that they can move relative to each other.

Whether or not a backing bar is used, once an initial pass has been laid down, the weld may be self-backing. That is, an initial weld may be made in the normal manner, with or without vibration of holder 452. Subsequent passes may follow, with holder 452 set to vibrate. Several passes may be applied to build up a weldment.

Also in the arrangement of FIG. 19, a vibration transmission is indicated as 460. There may be a single vibration head 462, or more than one head, 464, 466, 468. At least one of the heads is actively operable to transmit vibration to the workpiece. One or more of the other heads may act as stationary reaction members, or abutments, or all of them may be "live". They may transmit on individual frequencies. The frequencies need not be the same. They may be the same frequencies, or ranges of frequencies as described above. Some of the heads may be on one side of the material, some may be on the other side of the weldment in the y-direction, or, alternatively, or additionally, may be on opposite faces of the workpiece, as shown. Pairs of heads may be opposed, such as 462, 466, or 464, 468.

It may be that one or more of the heads has an engagement member, or pad, or sole plate, or foot 470. It may be that foot 470 is free of gouging or plastic deformation elements. That is, whereas indenters or other probes for vibrating workpieces are known, the act of indenting may introduce local plastic deformation defects or non-homogeneities, or singularities in the workpiece where such defects may not be desired, e.g., as where they may tend subsequently to act as fatigue initiation sites. Foot 470 may therefore not include, that is, may be free of, plastic deformation members, such as indentation members. Foot 470 may be substantially flat or smooth. In some embodiments, foot 470 may be a roller, whether cylindrical or spherical. In either case foot 470 provides a workpiece engagement, or workpiece interface, member, that acts as a vibration transmitter or transmission member or transition interface, through which an exciting vibration may be introduced into the adjacent workpiece. Foot 470 may be clamped or otherwise held against the workpiece. Foot 470 may be urged against the workpiece with biasing members, such as springs, which are themselves backed by a jog, or fitting, or frame.

The vibration so introduced into the workpiece may be ultrasonic vibration, such as described above. The vibration need not be sinusoidal, and need not be period. It may, however, be convenient for the vibration to have a given frequency (which may be adjustable) and amplitude. The vibration imposed upon the workpiece may be independent of the vibration applied to holder 454, and may be applied whether holder 454 is then vibrating or not. Vibration may be applied to the workpiece when holder 454 is not transmitting welding current to the workpiece, or when the welding current is at the reduced voltage. The vibration imposed on the workpiece may be imposed either during the welding material deposition, or during agitation or peening at reduced (or zero) voltage.

Figure 20:
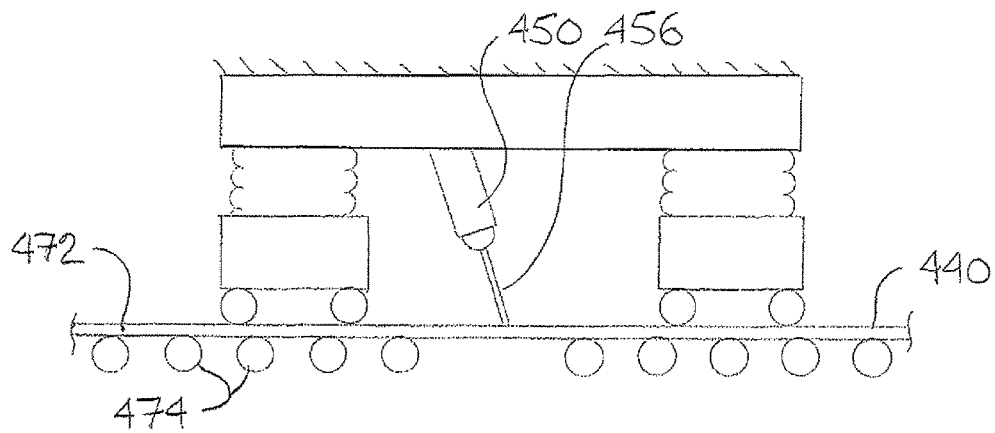
FIG. 20 is a side view of a welding arrangement of an aspect of the invention.
Figure 21:
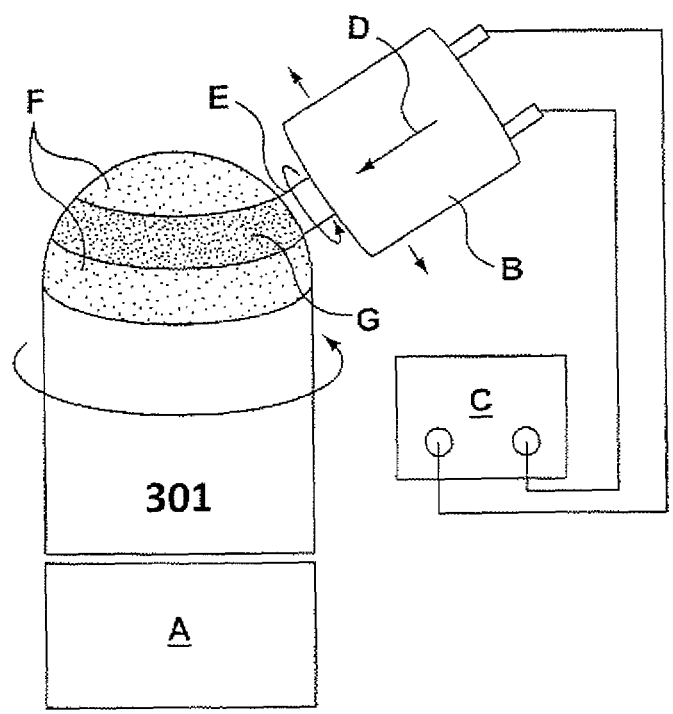
FIG. 21 shows a conceptual relationship of elements according to an embodiment of the invention.
Figure 22:
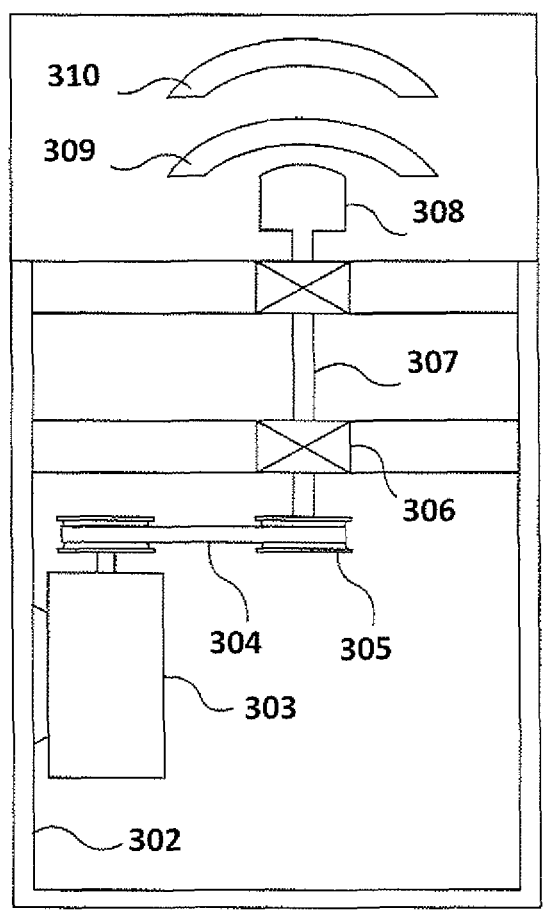
FIG. 22 shows a schematic view of a workstation for the clamping and rotation of a workpiece such as may be coated according to the embodiment of FIG. 21.
Figure 23:
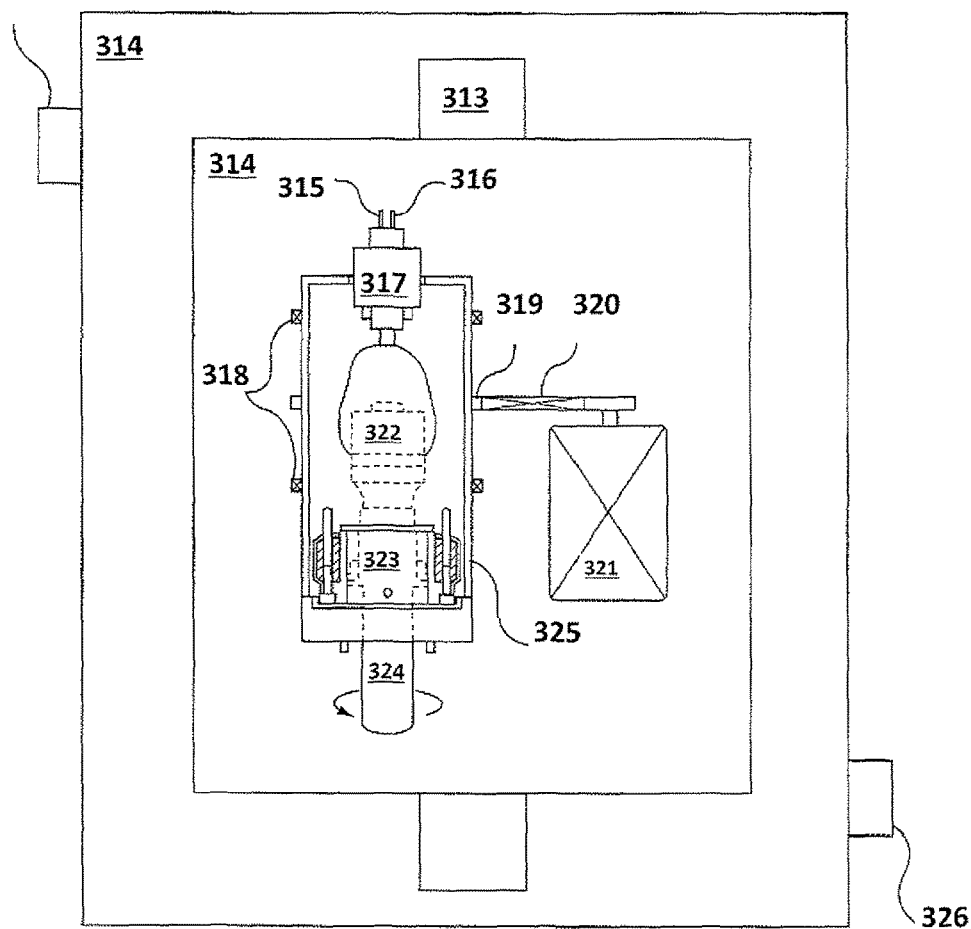
FIG. 23 shows a general layout of structural and operational elements of an integrated ultrasonic rotating friction assembly according to the embodiment of FIG. 21.
Figure 25:
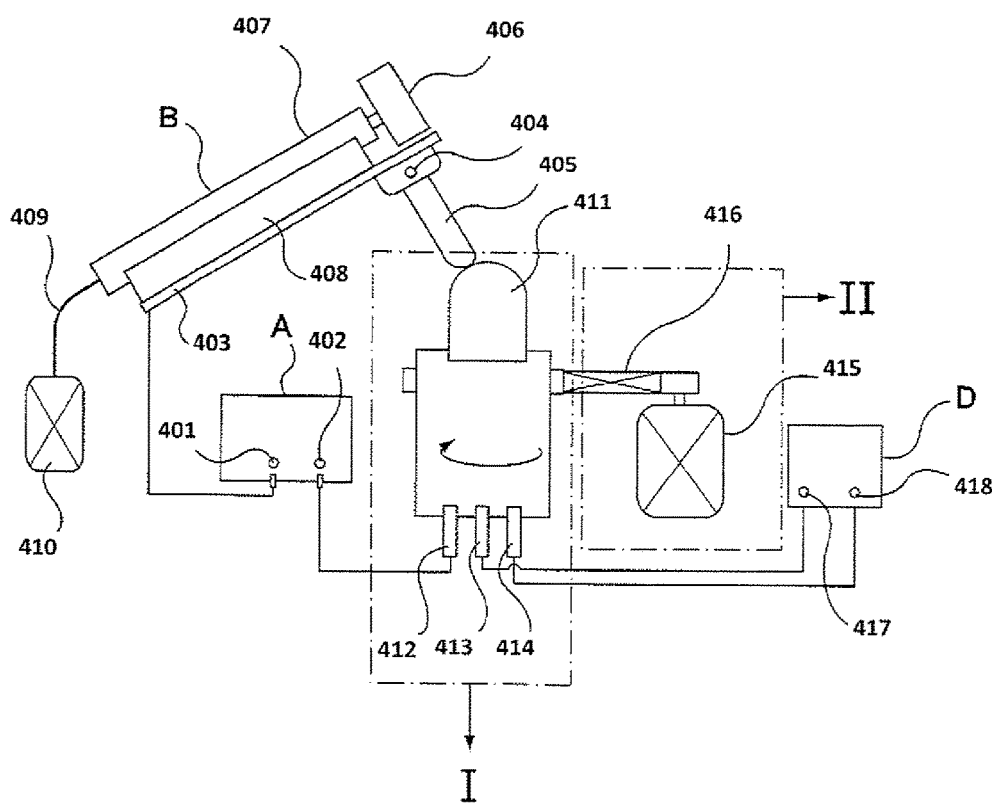
FIG. 25 is a conceptual illustration of an embodiment of apparatus according to an aspect of the invention herein.
Figure 26:
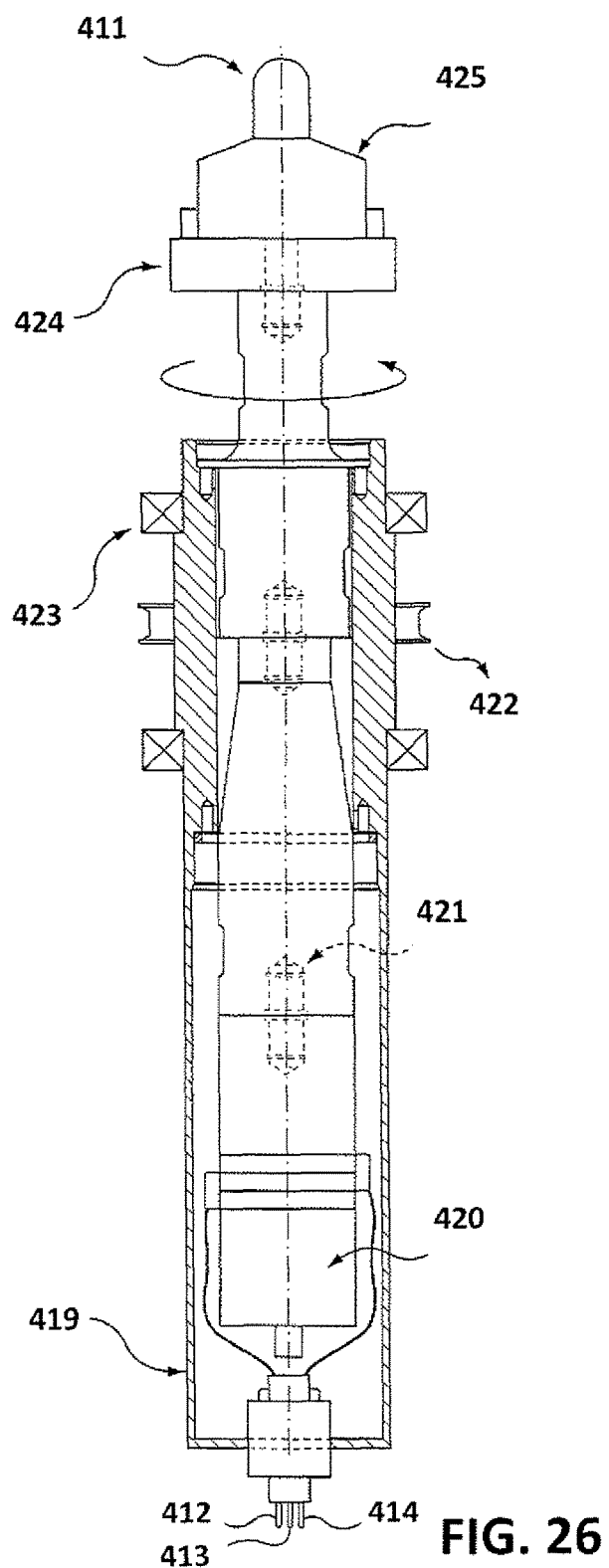
FIG. 26 is a basic illustration of a workbench of the apparatus of FIG. 25.

As suggested in FIG. 20, the welding head (which may be multiple welding heads) may be mounted on a frame 470. And the workpiece may be mounted on a moving table or bed 472, suggested by an array of rollers 474. The table or bed may, for example, move in translation under electrode 474, such as horizontally in the x-direction (across the page as shown) or transversely in the y-direction (into or out of the page as shown). These degrees of freedom of motion may be independent of any vibratory or oscillatory drive. That is, ultrasonic vibration may take place at a very small scale of displacement. The table or bed may move globally. The table or bed or welding head may be programmed to follow a path which one or the other, or both, of the welding head and the workpiece vibration exciter is in operation.

The various materials, processes, drives, voltages and frequencies of the embodiments described above in the context of FIGS. 1 to 17 and 21 to 29 are applicable to the apparatus and method pertaining to FIGS. 19 and 20. The welding tool of the apparatus and method of FIGS. 21-29 may be the apparatus of FIGS. 1-17, suitably adjusted and employed to conform to that description.

As many variations and modifications are possible, the application of this invention covers is intended not only to encompass the above mentioned example, but also to encompass such other concepts or alternations falling within the principles, aspects, and features of the invention shown and described herein.

What has been described above has been intended illustrative and non-limiting and it will be understood by persons skilled in the art that other combinations of the features described above, and modifications, may be made without departing from the scope of the disclosure as defined in the claims appended hereto. Various embodiments of the invention have been described in detail. Since changes in and or additions to the above-described apparatus and process may be made without departing from those aspects, the invention is not to be limited to those details but only by the appended claims.

We claim:

1. A method of welding a workpiece, said method comprising:
   providing a fixture to which to secure the workpiece;
   mounting a first vibration source to said fixture to transmit a first vibration signal to the fixture and to the workpiece, said first vibration source including at least one ultrasonic vibration head;
   opposing the workpiece with a welder, said welder being separate from said first vibration source;
   positioning a welding head of the welder to address the workpiece held in the fixture;
   providing a motion transmitting drive apart from said first vibration source to at least one of (a) said fixture and (b) said welding head, and operating said motion transmitting drive to cause relative motion between the fixture and the welding head;
   operating the welder to vibrate the welder according to a second vibration signal;
   operating the first vibration source while operating the welder;
   operating the first vibration source independently of operation of the welder;
   operating said ultrasonic vibration head to transmit ultrasonic vibration to the workpiece during welding;

operating the welding head, including (i) operating the welder at a first voltage magnitude for a first time period, and at a second voltage magnitude at a second time period; (ii) operating the welder to vary voltage between said first voltage magnitude and said second voltage magnitude; and vibrating the welding head during operation to vibrate independently of vibration of said fixture.

2. The method of claim 1 including providing a power source operable to drive said welding head, and operating said power source to drive said welding head in both of (a) a welding mode and (b) a peening mode.

3. The method of claim 1 including programming at least one of said fixture and said welding head to move according to a pre-set course.

4. The method of claim 1 including, in use, biasing the welding head against the workpiece.

5. The method of claim 1 including providing to the first vibration source an engagement member for contacting the workpiece, and said engagement member being free from plastic deformation elements.

6. The method of claim 1 wherein said method includes vibrating the welder to peen deposited weld metal during transmission of the first vibration signal.

7. The method of claim 1 wherein the second voltage magnitude is zero.

8. The method of claim 1 wherein said method includes:
securing the workpiece in said fixture; and
moving at least one of the fixture and the welding head along a pre-programmed path while transmitting said first vibration signal to the workpiece.

9. The method of claim 1 wherein the workpiece has more than one part, and said method includes welding at least two parts of the workpiece together.

10. The method of claim 1 wherein the method includes operating the welder to deposit a material on the workpiece that is different from the parent material of the workpiece.

11. The method of claim 10 wherein the first vibration signal is an ultrasonic vibration signal and said method includes applying said ultrasonic vibration directly to the workpiece during at least one of:

(a) application of a welding rod to the workpiece;
(b) crystallization of welded material; and
(c) peening of welded material.

12. The method of claim 1 wherein said method is a method of surface coating the workpiece.

13. The method of claim 12 wherein the first vibration signal is an ultrasonic vibration signal and said method includes applying said ultrasonic vibration directly to the workpiece during at least one of:

(a) application of a welding rod to the workpiece;
(b) crystallization of welded material; and
(c) peening of welded material.

14. The method of claim 1 wherein ultrasonic vibration is applied directly to the workpiece during at least one of:

(a) application of a welding rod to the workpiece;
(b) crystallization of welded material; and
(c) peening of welded material.

15. The method of claim 14 wherein ultrasonic vibration is applied to the workpiece during at least two of:

(a) application of a welding rod to the workpiece;
(b) crystallization of welded material; and
(c) peening of welded material.

16. The method of claim 15 wherein said welding process is an ESD process and the welder uses a welding rod having a ceramic material composition that includes at least one of (a) TiC; and (b) $TiB_2$.

17. The method of claim 1, said method comprising vibrating the welder to peen deposited weld metal during, and independently of, transmission of the first vibration signal.

18. The method of claim 17 wherein said method is a method of surface coating the workpiece with a material that is different from the parent material of the workpiece.

19. The method of claim 1 wherein said method includes:
securing the workpiece in a fixture; and
moving at least one of the fixture and the welding head along a pre-programmed path while transmitting said first vibration signal to the workpiece.

* * * * *